United States Patent
Chen et al.

(10) Patent No.: US 11,144,812 B2
(45) Date of Patent: Oct. 12, 2021

(54) MIXED MACHINE LEARNING ARCHITECTURE

(71) Applicant: Facebook, Inc., Menlo Park, CA (US)

(72) Inventors: Xianjie Chen, Newark, CA (US); Wenlin Chen, Mountain View, CA (US); Liang Xiong, Fremont, CA (US); Tianshi Gao, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 869 days.

(21) Appl. No.: 15/694,707

(22) Filed: Sep. 1, 2017

(65) Prior Publication Data

US 2019/0073581 A1 Mar. 7, 2019

(51) Int. Cl.
*G06N 3/04* (2006.01)
*G06N 3/08* (2006.01)
*H04L 29/08* (2006.01)

(52) U.S. Cl.
CPC .......... *G06N 3/04* (2013.01); *G06N 3/08* (2013.01); *H04L 67/10* (2013.01)

(58) Field of Classification Search
CPC ............ G06N 3/04; G06N 3/08; H04L 67/10
See application file for complete search history.

(56) References Cited

U.S. PATENT DOCUMENTS 9,514,404 B1 * 12/2016 Corrado ................ G06N 3/084
2015/0019640 A1 * 1/2015 Li ........................... G06F 3/00
709/204

OTHER PUBLICATIONS

Qu et al., "Product-Based Neural Networks for User Response Prediction," 2016 IEEE 16th International Conference on Data Mining (ICDM), Barcelona, 2016, pp. 1149-1154, doi: 10.1109/ICDM.2016.0151 (Year: 2016).*
Qiu et al., "Context-Dependent Sense Embedding," Proceedings of the 2016 Conference on Empirical Methods in Natural Language Processing, pp. 183-191, Austin, Texas, Nov. 1-5, 2016 (Year: 2016).*
Wang et al., "Deep & Cross Network for Ad Click Predictions," arXiv:1708.05123v1 [cs.LG] Aug. 17, 2017 (Year: 2017).*
Liu et al., "Collaborative Prediction for Multi-entity Interaction With Hierarchical Representation." CIKM'15, Oct. 19-23, 2015, Melbourne, Australia (Year: 2015).*
He et al., "Neural Collaborative Filtering." arXiv:1708.05031v2 [cs.IR] Aug. 26, 2017. (Year: 2017).*
Guo et al., "DeepFM: A Factorization-Machine based Neural Network for CTR Prediction." arXiv:1703.04247v1 [cs.IR] Mar. 13, 2017 (Year: 2017).*
Zhang et al., "Deep Learning based Recommender System: A Survey and New Perspectives." arXiv:1707.07435v5 [cs.IR] Aug. 3, 2017 (Year: 2017).*

(Continued)

*Primary Examiner* — Miranda M Huang
*Assistant Examiner* — Yao D. Huang
(74) *Attorney, Agent, or Firm* — Baker Botts L.L.P.

(57) ABSTRACT

A preprocessing module of a neural network has a first input and second input. The module generates multiple, different first latent vector representations of its first input, and multiple, different second latent vector representations of its second input. The module then models pairwise interactions between every unique pairwise combination of the first and second latent vector representations. The module then produces an intermediate output by combining the results of the modeled pairwise interactions.

20 Claims, 17 Drawing Sheets

(56) References Cited

OTHER PUBLICATIONS

Neelakantan et al., "Efficient Non-parametric Estimation of Multiple Embeddings per Word in Vector Space," arXiv:1504.06654v1 [cs.CL] Apr. 24, 2015 (Year: 2015).*
He et al., "Neural Factorization Machines for Sparse Predictive Analytics." SIGIR'17, Aug. 7-11, 2017, Shinjuku, Tokyo, Japan (Year: 2017).*
Convington et al., "Deep Neural Networks for YouTube Recommendations." ReeSys 'Sep. 15-19, 2016, 2016, Boston, MA, USA (Year: 2016).*
Chen, Wenlin, "Learning with Scalability and Compactness", Washington University in St. Louis, Engineering and Applied Science, May 15, 2016.

* cited by examiner

MIXED MACHINE LEARNING ARCHITECTURE

TECHNICAL FIELD

This disclosure generally relates to neural network (NN) machine learning (ML) model architectures, methods/systems for training the ML models, and methods/systems for implementing the ML models.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may use an machine learning model to identify content or messages of interest to the user based on various criteria/input sources, such as for example, a user's input, a user's profile, a user's social graph (described below), etc. The social-networking system may send over one or more networks the content or messages, which may be related to its services, to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a computing device (e.g., a server computing machine), may access a neural network (NN) machine learning (ML) model that includes a (pre-processing) module (e.g., a preprocessing block/module that may process input data and place the data in a format better suited for further processing within the NN ML model). The accessed neural network model may be a multi-layer perception (MLP) NN architecture/model. The accessed module may have a first (vector) input and a second (vector) input, and the computing device may process the accessed module to generate multiple, different, first latent vector representations (e.g. different first embeddings) of the first input, and generate multiple, different, second latent vector representations (e.g. different second embeddings) of the second input. Processing of the accessed module by the computing device may further produce modeled pairwise interactions (e.g., dot products or cosine similarities) between unique pairwise combinations of the first latent vector representations and the second latent vector representations, and produces an intermediate output of the module by combining (e.g., by concatenation) results of the modeled pairwise interactions.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
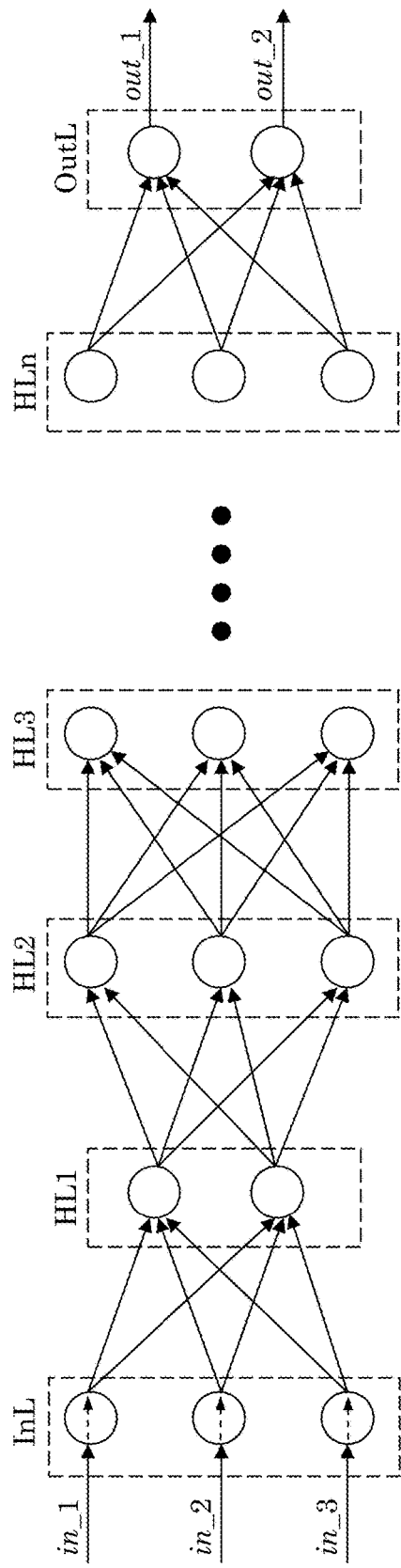
FIG. 1 illustrates an example of a multilayer perception (MLP) neural network.

Various machine learning (ML) architectures (or models), and approaches to training and using (operating) the ML model are herein provided.

In particular embodiments, a method and system (e.g., an ML model) is provided for predicting an outcome based on a combination of dense and sparse (vector) inputs, where higher order relationships between the inputs may be taken into consideration as part of the prediction. A dense (vector) input may be represented by a mostly-populated vector, and in particular embodiments, may consist of determinable descriptors common to most users (or circumstances, depending upon a specific application), such as gender, time-of-day, local Wi-Fi status, etc. A numeric value may be assigned to each descriptor (dimension or cell) in the dense (vector) input. A sparse (vector) input may reflect more semantic information related to a particular task objective. The sparse input may reflect selections within a larger list(s) of options (lists may further be divided into different categories). For example, a sparse input may reflect a short list of webpage IDs indicating which webpages (from within a larger list (e.g., dense vector housing the larger list) of webpages) a user has visited within a predefined time frame. Consequently, the elements of a sparse vector may be mostly zero values (e.g., zero value may correspond to the not-selected options within the larger list). In order to avoid long sequences of consecutive cell positions having a zero value representing a not-selected option, a sparse vector may be represented as a series of indexes pointing to selected positions in the larger list along with each index's corresponding numeric (non-zero) value for that position. For example, the indexed positions may correspond to positions of non-zero values (e.g. selected IDs) within the larger list, e.g., correspond to cell positions of selected IDs within the dense vector housing the larger list.

In particular embodiments, a sparse neural network (NN) machine learning (ML) model and supervised training data may be used to learn various embedding values, which may then be used to make predictions. The ML model may use a multi-layer perception (MLP) approach, where outputs from one learning layer (e.g. hidden layer) are fed forward to one or more other learning layers. In operation, the dense and sparse inputs may be combined (which may include replacing inputs with embedded/pooling representations) in a pre-processing stage (or module) and fed into a first learning layer (e.g., an input layer or hidden layer in an MLP approach). End-to-end training (such as by back-propagation) using supervised training data may be used to learn network weights (e.g., parameters or gradient values) and embedding (e.g., parameter or gradient) values. An ML model may be deemed trained when such parameters/gradients values have been determined, e.g., when outputs of the ML model agree with test output parameters to within a predefined degree.

In particular embodiments, sparse inputs may be determined based on various observations, or characteristics, about a user (or circumstance) or other feature input, such as reflecting an inferred preference or tendency of the user or a categorized characteristic of the user/feature. This inference may be achieved by use of a Random Forest, or other classification or regression tool, prior to defining higher order relationships between the inputs. For example, a feature input may be submitted to a group of Boosted Decision Tree (BDT) trees and each tree may provide an ID based on the leaf to which the feature input corresponds. In this manner, the group of BDT trees provides a list of IDs, which together may define a sparse input.

Sparse inputs (and optionally some dense inputs) may consist of a list-of-IDs, and prior to being combined with other (vector) inputs, each input may be submitted to an Embedding-Pooling (EP) (processing) block/circuit. The embedding portion of the EP block may convert each ID (which may represent a webpage, an ad, or other category item associated with a user) to a vector representation in an embedding space. That is, each ID in the list-of-IDs may be replaced by an embedding (e.g., a fixed-length vector of (optionally, randomly assigned) real numbers whose weights need to be learned). For example, each ID may be represented by a 32-dimension embedding (e.g., a vector having 32 entry fields, or dimensions, or cells).

The pooling portion of the EP block may then combine the resultant embeddings into a single vector, and thereby create a more condensed representation. Entries of corresponding dimensions in each embedding may be combined (pooled or aggregated) using a predefined pooling method (e.g., summing, averaging, max value, etc.) to define an EP output vector of fixed length that represents the combination of all the original (sparse) input(s) that received embeddings. In particular embodiments, the pooling method may apply different weights to each embedding used in the combination. Since information may be lost during this aggregating process, the pooling process may be modified to preserve some/select relational information between the list-of-IDs of an original input.

In particular embodiments, a method to preserve select relational information between the list-of-IDs of an original input may include making use of a ranking between the IDs in a list-of-IDs based on a history of user interactions with the specific IDs. For example, if the IDs represent different webpages, then a ranking may be based on the frequency with which the user visits each webpage, or shared content from each webpage, or commented on each web-page, or otherwise interacted with each webpage. This ranking may then be used to weigh the embeddings. Additionally, a function utilizing user-based features may be defined to assign or modify weights in the embedding.

Context information may also be used to modify embedding weights. For example, if a current ID within the list-of-IDs is determined to not be relevant to a current objective, then its embedding may be zeroed, effectively eliminating it from consideration. Alternatively, if an ID is strongly related to a current objective, then its embedding weight may be increased. For example, if the "context" is defined by a specific user ID, and prior behavior of this user has been found to be a good indicator of future behavior in a current context, then the weight of the user ID's embedding may be increased.

It is to be understood that irrespective of the initialized weights assigned to the embedding, the weights may likely change during the training of the ML model, and thus may not reflect final weight values.

In particular embodiments, the same sparse input (e.g., same list-of-IDs) may be submitted to multiple EP blocks to create multiple, alternate EP output vector representations of the same sparse (vector) input. Because each EP block may assign a different, randomly selected embedding to each ID (in the list-of-IDs that may make up a sparse input) each time the sparse input is submitted, an alternate EP output vector representation may be created, each different from another.

The above-mentioned, higher order relationships between inputs may be defined in multiple preprocessing modules (or preprocessing layers/stages), which may be linked in sequence. Within each preprocessing module, a combined representation may be obtained between every combination of its dense input and one, two, or more sparse inputs (e.g., the EP output vector representations of its one, two, or more sparse inputs). For example, the combined representation may be obtained by dot product or cosine similarity, both of which provide a more explicit way to model pairwise interactions between different features. Within each preprocessing module, the obtained combined representations may then be concatenated with the respective preprocessing module's original dense input to define a concatenated output for the module. For example, a first preprocessing module may concatenate its obtained first combined representation with its dense input to define a first concatenated output, which may be submitted as a dense input to a second preprocessing module. The second preprocessing module may receive the same (or different) spare inputs as the first preprocessing module, and may generate embeddings based on the inputs, where the embeddings may be different from the embeddings generated by the first preprocessing module, even if the two sets of embeddings were generated based on the same sparse inputs. The second preprocessing module may concatenate its obtained second combine representation with its dense input (the first concatenated output) to define a second concatenated output, which may be treated as a third dense input to a third preprocessing module, in sequence. The present process may then be repeated within the third preprocessing module to define a third concatenate output that may be submitted to a fourth preprocessing module or to a learning layer within a neural network model.

Separating the inputs into multiple preprocessing modules, and limiting the number of inputs per preprocessing module (in a sequence of preprocessing modules) may help maintain computer resources (e.g., memory requirements and processing time) manageable. Optionally, a different sparse input may be introduced at any preprocessing module. If all the unique sparse inputs are introduced in the same module, the number of combination operations that need to be performed (e.g., dot product) may be in the order of n-choose-2 (e.g., if the number of inputs, including dense and sparse vectors, is 100, then 4950 combination operations may be performed). In contrast, the framework described above for handling higher-order interactions would limit the number of combination operations to be linearly related to the number of unique sparse inputs. Alternatively, an output from one preprocessing module may traverse multiple preprocessing modules (in sequence) before being combined with any sparse input(s) in another preprocessing module (or in a learning layer) in the sequence.

In particular embodiments, the present method may be used to identify, or predict, commercial products (e.g., ads or stories/images in a newsfeed) that a user may be interested in pursuing. The ML modeling architecture described above provides an efficient way for a ML model to be trained on and make predictions based on sparse feature data.

In particular embodiments, a method and system are provided for predicting an outcome. The method and system may include identifying (or defining) multiple different relationships between the same pairs of inputs, and mixing the identified multiple relationships. An example implementation may use a SparseNN model (e.g., a neural network (NN) machine learning (ML) model) and supervised training data to learn various embedding values, which may then be used to make predictions.

The ML model may use a multi-layer perception (MLP) approach, where outputs from one learning layer (e.g., a hidden layer) are fed forward to one or more other learning layer(s). In operation, a pair of inputs (including a pair of dense inputs, sparse inputs, or a combination of both) may be submitted to one or more preprocessing modules before being submitted to a learning layer. Each preprocessing module may define a relationship between its respective pair of inputs, such as by combining the pair of inputs, including replacing its respective pair inputs with embedded/pooling representations prior to combining. End-to-end training (such as by back-propagation) using supervised training data may be used to learn network weights and embedding values (weights/parameters/gradients).

In particular embodiments, each pair of inputs may consist of dense inputs, sparse inputs, or a combination of both. A dense input may be represented by a mostly-populated vector consisting of determinable descriptors common to most users (or circumstances, depending upon a specific application), such as gender, time-of-day, local Wi-Fi status, etc. A numeric value may be assigned to each descriptor (dimension) in the dense (vector) input. A sparse (vector) input may reflect more semantic information related to a particular task objective. The sparse input may be a vector that reflects individual selections within a larger list(s) of options (lists may further be divided into different categories). For example, a sparse (vector) input may reflect a short list of webpage IDs indicating which webpages (from within a larger list of webpages) a user has visited within a predefined time frame.

Optionally in particular embodiments, sparse inputs may be determined based on various observations, or characteristics, about a user (or circumstance) or other feature inputs, such as reflecting an inferred preference or tendency of the user or a categorized characteristic of the user/feature. This inference may be achieved by use of a Random Forest, or other classification or regression tool, prior identifying different relationships between pairs of inputs. For example, a feature input may be submitted to a group of Boosted Decision Tree (BDT) Trees, and an each tree may provide an ID based on the leaf to which the feature input corresponds. In this manner, the group of BDT Trees provides a list of IDs, which together may define a sparse input.

In particular embodiments, each preprocessing module may include Embedding-Pooling (EP) blocks each processing a different input, dot products blocks that may define pairwise interactions of outputs from the EP blocks, and a concatenation block that may combine the outputs of the dot product blocks. In particular embodiments, each dense and sparse input may consist of a list-of-IDs, and may optionally be submitted to a different EP block. The embedding portion of an EP block may convert each ID to a vector representation in an embedding space. That is, each ID in the list-of-IDs may be replaced by an embedding (e.g., a fixed-length vector of randomly selected values whose weights need to be learned). For example, each ID may be represented by a 32-dimension embedding (vector).

A pooling portion of an EP block may then combine the resultant embeddings into a single vector. Entries of corresponding dimensions in each embedding may be combined (pooled or aggregated) using a predefined pooling method (e.g., summing, averaging, max value, etc.) to define an EP output vector of fixed length that represents the original input. Since information may be lost during this aggregating process, the pooling process may be modified to preserve some relational information between the list-of-IDs of an original input.

Relational information between the list-of-IDs of an original input may be preserved using a ranking between the IDs in a list-of-IDs, where the ranking may be defined based on a history of user interactions with specific IDs. For example, if the IDs represent different webpages, then a ranking may be based on the frequency with which the user visited each webpage, or shared each webpage, or commented on each web-page, etc. This ranking may then be used to weigh the embedding (e.g., where higher frequencies are assigned higher weights). Additionally, a function utilizing user-based features may be defined to assign or modify weights in the embedding.

Context information may also be used to modify embedding weights in what may be termed attention based pooling. For example, if a current ID within a list-of-IDs is determined to not be relevant to a current objective, then its embedding may be zeroed. Alternatively, if an ID is strongly related to a current objective, then its embedding weight may be increased. For example, if the "context" is defined by a specific user ID, and prior behavior of this user has been found to be a good indicator of future behavior in a current context, then the weight of the user ID's embedding may be increased.

It is to be understood that irrespective of the initialized weights assigned to the embedding, the weights are likely to change during the training of the ML model, and thus may not reflect final weight values.

In particular embodiments, in order to identify multiple different relationships between pairs of inputs (both dense and sparse), each input in a pair of inputs may need to have multiple representations (e.g., the same input may be represented in multiple, different ways). For instance, a first relationship between a pair of inputs may be represented by a corresponding pair of embeddings in an embedding space. Conceptually, the relative distance between the embeddings in this space may represent a degree of similarity/difference between the two with respect to that first relationship. Similarly, a second relationship between the same pair of inputs may be represented by a corresponding second pair of embeddings in a second embedding space. The relative distance between the second pair of embeddings may again represent a degree of similarity/difference between the two inputs with respect to the second relationship. Pair-wise relationship between the multiple representations may then be determined, in what may termed a mixed ML approach.

In this approach, multiple representations of a dense or sparse input may be achieved by submitting the same input (same list-of-IDs) to multiple EP blocks to create multiple, alternate EP output vector representations of the same input. Because each EP block may assign a different, randomly selected embedding to each ID (in the list-of-IDs), the multiple, alternate EP output vector representations may be made different from one another as the machine learning process learns of the different relationships.

Also in this mixed ML approach, multiple relationships between different pairs of inputs may be obtained by identifying relationships between their respective, multiple representations. For example, the combined representation may be obtained by a dot product or cosine similarity, both of which provide a more explicit way to model pairwise interactions between different features. A dot product may be determined between every combination of each input's multiple representations (within an input pair). The obtained dot products may then be concatenated together to define a mixture representation vector, which may be used as an input within the SparseNN model. For example, if the ML model uses a multi-layer perception (MLP) approach, where outputs from one learning layer are fed forward to one or more other learning layers, the mixture representation vector may be input to a first learning layer. Additional mixing of relationships between the mixture representation vector and a third (dense or sparse) input may be achieved by repeating the present process in a second preprocessing module. This may be achieved by identifying multiple representations of a current mixture representation vector and pairing these representations with multiple representations of a third input.

The present method may be used to identify, or predict, commercial products (e.g. Ads) that a user may be interested in pursuing.

Hogwild and elastic averaging stochastic gradient descent (EASGD) are variants of stochastic gradient descent (SGD), which may be used to optimize a neural network using backpropagation. Under specific limitations, Hogwild and EASGD may provide some benefits over a basic SGD approach, but typically, Hogwild and EASGD have contradicting operational requirements. Nonetheless, in particular embodiments, a method and system are herein provided to create a novel variant of stochastic gradient descent that incorporates some benefits of Hogwild and EASGD in a multi-processor (e.g., multi-GPU or multi-CPU) infrastructure. In particular embodiments, another method and system is further provided to add an asynchronous SGD approach to the present novel variant of stochastic gradient descent.

In the following, GPU machines (computing machines that use the multiple, small processing units that may operate in parallel, e.g. each defining a separate operational thread, in a graphic processing unit (e.g., graphics card) to process data) may be used to handle preprocessing work (e.g., process large amounts of data to reduce the data size or place the data in a format suitable for further processing) in the training of a machine learning (ML) model (e.g., a neural network, NN, model). In some embodiments, GPU machine may herein be optionally identified as "readers."

Processed data from GPU machines may be streamed (transferred) to CPU machines (machines that have one or more dedicated, multi-purpose central processing units, CPUs) that further process the data (e.g., according to an NN model) in a less parallel manner than in the GPU machine to extract information, such as inferences between input data terms (features). In some embodiments, CPU machines may be termed "readers" or "trainers". In general, reader machines may handle preprocessing work and stream their results to trainer machine.

One embodiment of the present disclosure is implemented in a two tier process. In the first tier, ML model data may be split across multiple GPUs. The ML model in the present disclosure may not be large enough to use all the CPUs in a typical GPU, therefore the model data allotted to each GPU may be further divided into multiple (50-100) model threads (workers) to run in parallel. In specific embodiments, the workers within a GPU share a common memory without lock, which provides some of the speed benefits of Hogwild. However, whereas in Hogwild the shared memory would be the master memory, in the present case, the shared memory may be a local parameter memory of a GPU. That is, the shared memory in the GPU is not a master parameter memory for all workers in all GPUs, but may instead be a local memory that holds only local parameters of processing cores internal to that specific GPU.

The second tier may address the management of the multiple GPUs, and the management of a master parameter memory that is routinely updated to maintain a copy of the local parameter memories in multiple GPUs. Optionally, one of the multiple GPUs may be designated to hold the master parameter memory. At predetermined times, each of the multiple GPUs, in turn, synchronizes its local parameter memory with the master parameter memory. During synchronization with a given GPU, the master parameter memory is locked from access from any other GPU. In this manner, the master memory is updated as a moving average over the local parameters computed from the multiple GPUs.

In order to mitigate delays due to cross-GPU communications, the first tier (within each GPU) may be further augmented with a small group of independent communication workers (e.g., 4 to 8) dedicated to synchronizing a GPU's local parameter memory with the master parameter memory. In this manner, the GPU's other (50-100) model threads are not interrupted by the synchronization of their shared memory with the master parameter memory.

In some embodiments, an asynchronous approach may be applied to some of the preprocessing work described above. Firstly, parameters may be sharded (divided into sub-sets) across multiple parameter servers, which communicate with "trainer machines". In addition to holding a parameter shard, the parameter servers may further provide embeddings for input features (dense or sparse vector inputs), and if the resulting, active embedding is determined to be larger than a predefined value, the parameter server may further reduce the size of the data by applying pooling across embeddings. If the embedding is determined to be smaller than a predefined value, the parameter server may send the active embedding across a network to a trainer machine, where it may be pooled into a smaller size. The trainer machine may then combine pairs of pooled features by dot product, or other combining method. Alternatively, if the data size after pooling at the parameter server is within a predefined range, the parameter server may combine the data by dot-product and send the result to a trainer machine.

The trainer machines may use local workers to process data and compute local gradients on a mini-batch (or batch). The workers may then send (push) gradient updates to the parameter servers, which may process the updates asynchronously. In particular embodiments, the trainers may store parameter data in local memory without lock, and periodically (e.g., after each pass/iteration, or after a predefined number of passes/iterations) push their local gradient changes (parameter updates) to the appropriate parameter servers (as determined by the shard of parameters they hold). That is, each trainer has access to all parameter servers, and addresses a parameter server in accordance with the parameter memory shard that needs updating. Thus, the trainers may maintain a local parameter memory and the parameters servers may maintain the master parameter memory (as a composite of all the shards) averaged across multiple trainers. Additionally, the trainers may further dedicate a small, independent group of workers (e.g., 4 to 8) to synchronizing their local parameter memory with the master parameter memory (shards) in the parameter servers. In particular embodiments, trainers may be implemented in CPU-based or GPU-based machines.

In particular embodiments, a method and system is provided for splitting the execution (e.g. computer processing) of an already trained machine learning ML model (e.g. a Sparse NN, ML model) between a local machine and a remote machine, over a network. The local machine, which may be a local ranking machine, may be characterized by a computer architecture that emphasizes computational power over memory availability. The remote machine, which may be a back-end service such as remote predictor, may be characterized by a computer architecture that emphasizes availability of large memory banks over computational power. In addition to differences in computational resources, the local machine and the remote machine may have access to different data sets (e.g., the local machine may have access user features, e.g., user sparse of dense inputs). Particular embodiments may define (or access) a (nodal) graph representation of the ML model that identifies data processing, memory requirements, and optionally the number of inputs of each graph node, and may split the graph into multiple graph-segments that may be processed independent of each other. This segmentation allows each graph-segment to be distributed for processing to the machine with the appropriate resources (e.g., computational resource or data resource). For example, compute-intensive graph-segments may be designated for processing within the local machine and memory-intensive graph-segments may be designate for processing on the remote machine, while minimizing network traffic. Output results processed graph-segments may be sent to a merge processing block within the local machine, where they may be merged with outputs from other processed graph-segments according to the (nodal) graph representation of the ML model, and a final result may thereby be determined.

Before discussing the present embodiments in detail, it may be beneficial to first provide some background information regarding neural networks in general. A neural network, or neural net, is a (nodal) network of interconnected neurons, where each neuron represents a node in the network. Groups of neurons may be arranged in layers, with the outputs of one layer feeding forward to a next layer in a multilayer perception (MLP) arrangement. MLP may be understood to be a feedforward neural network model that maps a set of input data onto a set of output data.

FIG. 1 illustrates an example of a multilayer perception (MLP) neural network. Its structure may include multiple hidden (e.g. internal) layers HL1 to HLn that map an input layer InL (that receives a set of inputs (or vector input) in_1 to in_3) to an output layer OutL that produces a set of outputs (or vector output), e.g., out_1 and out_2. Each layer may have any given number of nodes, which are herein illustratively shown as circles within each layer. In the present example, the first hidden layer HL1 has two nodes, while hidden layers HL1, HL3 and HLn each have three nodes. Generally, the deeper the MLP (e.g. the greater the number of hidden layers in the MLP), the greater its capacity to learn. The input layer InL receives a vector input (illustratively shown as a three-dimensional vector consisting of in_1, in_2 and in_3), and may apply the received vector input to the first hidden layer HL1 in the sequence of hidden layers. An output layer OutL receives the output from the last hidden layer, e.g. HLn, in the multilayer model, processes its inputs, and produces a vector output result (illustratively shown as a two-dimensional vector consisting of out_1 and out_2).

Typically, each neuron (or node) produces a single output that is fed forward to neurons in the layer immediately following it. But each neuron in a hidden layer may receive multiple inputs, either from the input layer or from the outputs of neurons in an immediately preceding hidden layer. In general, each node may apply a function to its inputs to produce an output for that node. Nodes in hidden layers (e.g., learning layers) may apply the same function to their respective input(s) to produce their respective output(s), as described below. Some nodes, however, such as the nodes in the input layer InL receive only one input and may be passive, meaning that they simply relay the values of their single input to their output(s), e.g., they provide a copy of their input to their output(s), as illustratively shown by dotted arrows within the nodes of input layer InL.

Figure 2:
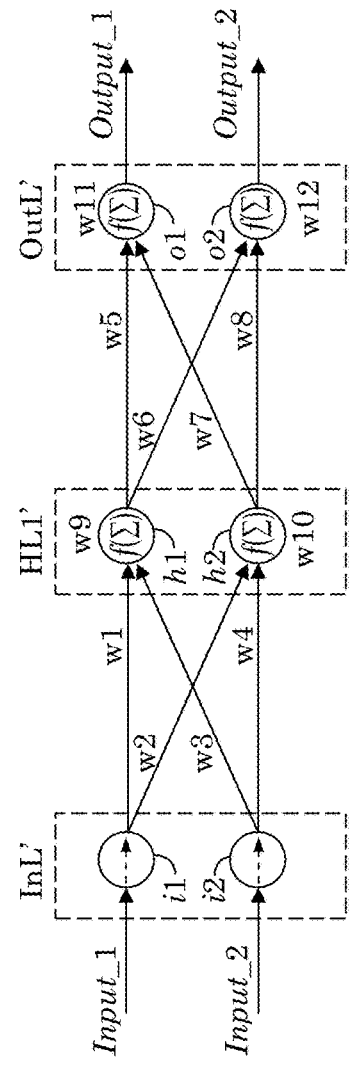
FIG. 2 shows a simplified neural network consisting of an input layer, a hidden layer, and an output layer.

For illustration purposes, FIG. 2 shows a simplified neural network consisting of an input layer InL', a hidden layer HL1', and an output layer OutL'. Input layer InL' is shown having two input nodes i1 and i2 that respectively receive inputs Input_1 and Input_2 (e.g. the input nodes of layer InL' receive an input vector of two dimensions). The input layer InL' feeds forward to one hidden layer HL1' having two nodes h1 and h2, which in turn feeds forward to an output layer OutL' of two nodes o1 and o2. Interconnections, or links, between neurons (illustrative shown as solid arrows) have weights w1 to w8. Typically except for the input layer, a node (neuron) may receive as input the outputs of nodes in its immediately preceding layer. Each node may calculate its output by multiplying each of its inputs by each input's corresponding interconnection weight, summing the products of it inputs, adding (or multiplying by) a constant defined by another weight or bias that may associated with that particular node (e.g., node weights w9, w10, w11, w12 respectively corresponding to nodes h1, h2, o1, and o2), and then applying a non-linear function or logarithmic function to the result. The non-linear function may be termed an activation function or transfer function. Multiple activation functions are known the art, and selection of a specific activation function is not critical to the present discussion. It is noted, however, that operation of the ML model, or behavior of the neural net, is dependent upon weight values, which may be learned so that the neural network provides a desired output for a given input.

The neural net learns (e.g., is trained to determine) appropriate weight values to achieve a desired output for a given input during a training, or learning, stage. Before the neural net is trained, the weights may be individually assigned an initial (e.g., random and optionally non-zero) value. Various methods of assigning initial weights are known in the art. The weights are then trained (optimized) so that for a given training vector input, the neural network produces an output close to a desired (predetermined) training vector output. For example, the weights may be incrementally adjusted in thousands of iterative cycles by a technique termed back-propagation. In each cycle of back-propagation, a training input (e.g., vector input) is fed forward through the neural network to determine its actual output (e.g., vector output). An error for each output neuron, or output node, is then calculated based on the actual neuron output and a target training output for that neuron. One then propagates back through the neural network (in a direction from the output layer back to the input layer) updating the weights based on how much effect each weight has on the overall error so that the output of the neural network moves closer to the desired training output. This cycle is then repeated until the actual output of the neural network is within an acceptable error range of the desired training output.

Thus, construction of a neural network model may include a learning (or training) stage and a classification (or operational) stage. In the learning stage, the neural network may be trained for a specific purpose and may be provided with a set of training examples, including training inputs and training (sample) outputs, and optionally including a set of validation examples to test the progress of the training. During this learning process, various weights associated with nodes and node-interconnections in the neural network are incrementally adjusted in order to reduce an error between an actual output of the neural network and the desired training output. In this manner, a multi-layer feed-forward neural network (such as discussed above) may be made capable of approximating any measurable function to any desired degree of accuracy. The result of the learning stage is a (neural network, machine learning) model that has been learned (e.g., trained). In the operational stage, a set test inputs (or live inputs) may be submitted to the learned (trained) ML model, which may apply what it has learned to produce an output prediction based on the test inputs.

The present disclosure provides multiple architectures for, and methods of training a, (neural network, NN) machine learning (ML) model that may provide deeply personalized predictions for users when used in an operational (or classification) stage. That is, the present disclosure may provide a ranking and recommendation (neural network) framework to deliver a more personalized experience for various service products, such as Ads Ranking, Feeds Ranking, Networking Services that prioritize items for sharing among users, Explore Services that identify items (e.g. pictures, videos, and articles) similar to items a user has previously liked, etc. This may be achieved by the present model architectures, which may include a nested architecture and a mixed architecture. The nested architecture may consider higher order relationships between inputs, and the mixed architecture may introduce a mixture of different representations of the same input. Additionally, model quality may be improved by various modifications to an embedding-pooling (EP) process that may strengthen semantic relationships between features/inputs.

For ease of illustration, some features of the present disclosure may be disclosed within the context of practical example implementations. Due to real-world hardware limitations, neural networks may have practical size limits. For example, in particular embodiments, the present ML models may achieve sizes not well-suited to these practical limits, such as 10 GB, which may complicate their hardware implementation. Therefore, in particular embodiments, specialized hardware implementations that may distribute the present ML model among local and remote machines on a network using specific optimization techniques may be provided.

For example purposes, in particular embodiments, the present ML model architectures may be implemented within a sparse neural network (Sparse NN) environment to facilitate learning from multiple forms of features (e.g., dense feature vectors and sparse feature vectors) jointly in end-to-end (e.g., multilayer perception) neural nets. In embodiments, dense feature vectors may be use to represent dense (vector) inputs, and sparse feature vectors may be used to represent sparse (vector) inputs.

As explained above, a dense feature vector (e.g., dense input) may be represented by a mostly-populated vector (e.g. a vector having mostly non-zero entries/cells). In the present example, a dense input may be a dense feature vector that may consist of determinable descriptors common to (or determinable for) most users (or circumstances, depending upon a specific application) and often gleaned from multiple sources. For examples, dense features may include a user's gender, country-of-origin, time-of-day, local Wi-Fi status, user-educational-background, etc. It is noted that some dense features may be obtained by user-provided input, while others may be collected from user-related demographic or geographic information, user-device status information, user network activity, or other observable user-related sources. A dense input may be thought of as a collection of multiple, definitely determinable descriptors, where each descriptor may be given a numeric value. Because dense inputs may be comprised of many descriptor types (e.g., signal/value sources) that together may characterized (e.g., describe) a user (or circumstance), a dense input may be a large, dense vector with one or more cells/dimensions/entries in the dense vector being designated to each descriptor type.

A sparse input may reflect more semantic information related to a particular task objective. The sparse input may be defined by a sparse feature vector that reflects selections within a larger list(s) of options (lists may further be divided/grouped into different categories). Additionally, sparse inputs may not necessarily be directly descriptive of a user (or circumstance), but may instead provide auxiliary information indirectly related to the user (or circumstance). For example, webpages may have a list of associated advertisements (e.g. ads posted by a webpage provider). While one sparse input may reflect the individual webpages visited by a user, another (related) sparse input may provide more semantic information and reflect the ads (selected from among a larger list of ads) that are associated with (e.g. available to) the individually visited webpages. Training data may indicate which associated ads a training user selected (clicked on), and the neural network model may learn to predict what is the probability of a test user (that is similar to the training user, such as determined from the training user's user-descriptive dense input and the test user's corresponding dense input) selecting the same (or a similar/related) ad.

A sparse input may include a list of select IDs, where the sparse input's semantic information may be embodied by its list of IDs. As an example, a sparse (feature) input may be constructed from selections of entries from a dense (feature) vector. This may be the case when the list of IDs that comprises the sparse input identifies individual selections from a larger list of options (such as provided by the dense vector). In this case, the sparse (vector) input may be used to capture individual selections from the features/entries in the dense vector. That is, within a sparse vector, individual selections may be represented by singular, or group, entries. For example, a sparse input may be a list of webpage IDs indicating which webpages (from within a larger category list of webpages) a user has visited within a predefined time frame, or has commented on, or liked, or has otherwise interacted with. In this case, the sparse (vector) input may have a separate cell (or group of cells) for each possible selection, and it may be populated by assigning a zero value to each not-selected option and assigning a non-zero value (e.g. numeral "1") to each selected option. As a result, a sparse vector may be characterized by having mostly zero entries, and a few non-zero entries. Consequently, a sparse vector may be represented as a series of indexes pointing to select cell positions (those having non-zero values) in the larger list along with each index's corresponding non-zero value for that position, with the understanding that all other positions not having an index have a default zero value.

In addition to providing information regarding selections from a larger list of options, sparse inputs may provide classification information. That is, sparse inputs may provide inferred information based on various observations, or characteristics, about a user (or circumstance) or based on other feature input selections. For example, a sparse input may indicate an inferred preference or tendency associated with a user/feature, or a classification (e.g., categorization) characteristic of the user/feature. This inference may be achieved by use of a Random Forest, or other classification or regression tool. It is to be understood that the classification or regression tool may be trained prior to training a neural network (ML model) in accord with the present disclosure. The classification or regression tool may be used to define entries (cells) of a sparse input. For example, a feature input may be submitted to a group of Boosted Decision Tree (BDT) trees and allowed to propagate (be distributed) through each tree in the group until reaching a leaf in each respective tree. Each tree may provide an ID (cell entry for the sparse input) based on the leaf to which the feature input propagated. In this manner, the group of BDT Trees may provide a list of IDs, which together may define a sparse input. As an example, a feature input submitted to the BDT trees may refer to a specific webpage, or age group, user-demographic, etc., or to a combination of such features. The inferred meaning of the sparse input provided by the BDT tree would be dependent upon what categorization (e.g., classifications) the BDT tree was trained to discern.

Typically, because of their many zero-entry cells, sparse vectors may not well-suited for direct input to a neural network. To place them in a form better suited for a neural network, sparse inputs may first be converted to low-dimensional (and dense) representations (e.g. vectors having fewer, but mostly non-zero, entries/cells). An example of this type of low-dimensional conversion by use of embedding matrices is provided below.

Figure 3:
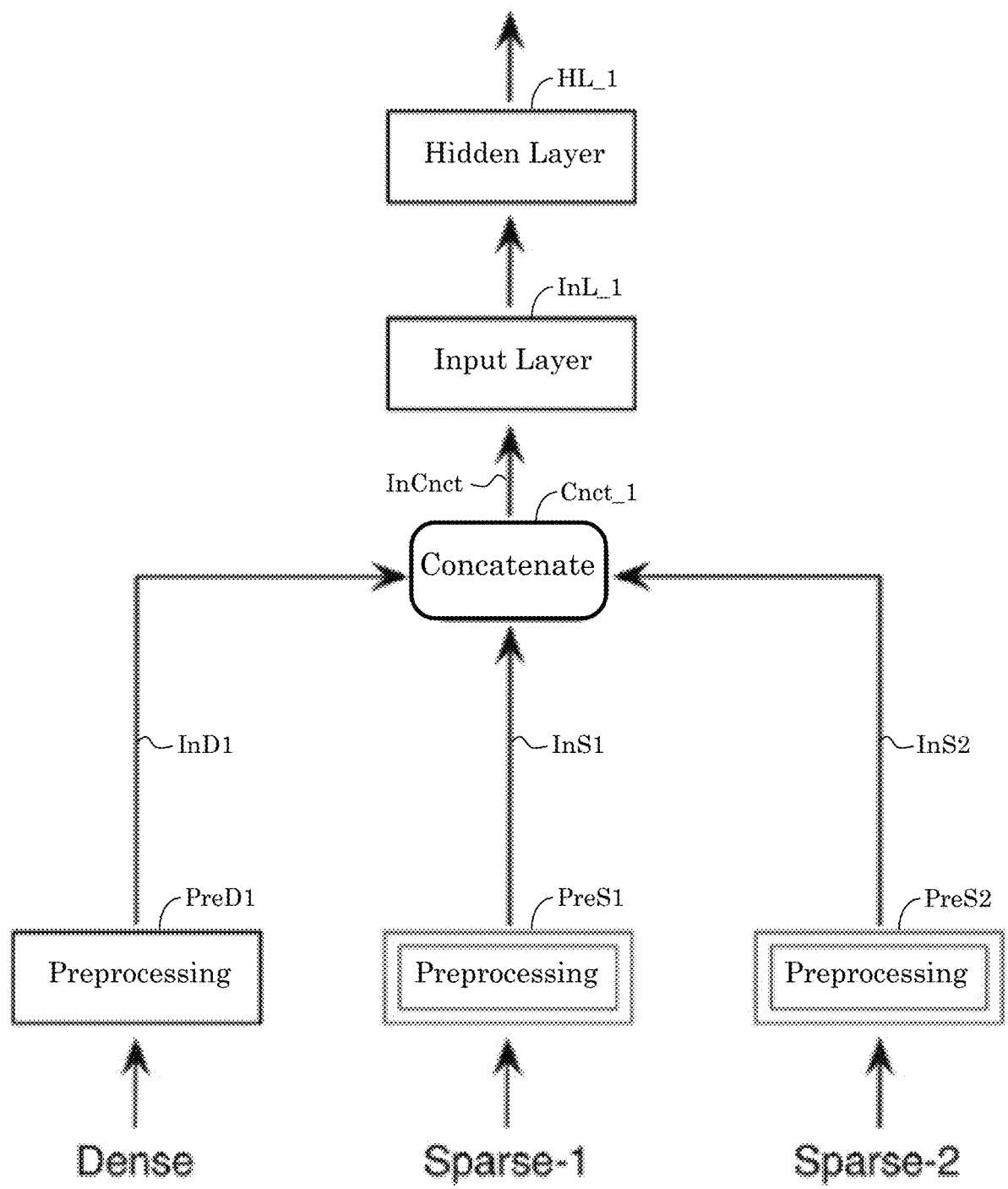
FIG. 3 illustrates a method of combining a one or more dense input and one or more sparse input in a neural net.

FIG. 3 illustrates a method of combining one or more dense input and one or more sparse input in a neural network. In the present example, preprocessing blocks PreD1, PreS1, and PreS2 may configure their respective inputs into formats better suited for a neural network. In the present example, preprocessing block PreD1 may be passive, meaning that it may convey its received input to its output without modification. For example, input "Dense" may be a dense (vector) input that is already in proper format for a neural network (e.g., it may have mostly non-zero entries), and preprocessing block PreD1 may recondition (e.g., boost/sharpen signal shapes) of input Dense to define (as intermediate output of block PreD1) input InD1 to combining (or concatenation) block Cnct_1.

As is explained above, however, sparse vectors, such as inputs Sparse-1 and Sparse-2, may have a large proportion of zero entries, and thus may not be optimally configured for a neural network. Preprocessing blocks PreS1 and PreS2 may convert their respective sparse inputs, "Sparse-1" and "Sparse-2," to corresponding low-dimensional vector representations, InS1 and InS2, (e.g., low dimensional dense vectors, e.g., vectors having a few (e.g., 32) mostly non-zero entries/cells). Preprocessing blocks PreS1 and PreS2 may apply the same preprocessing to their respective sparse vector inputs, Sparse-1 and Sparse-2, or preprocessing block PreS1 may preprocess Sparse-1 differently than block PreS2 preprocesses Sparse-2. Optionally, preprocessing blocks PreS1 and PreS2 may both implement a low-dimensional conversion/transformation, such as by use of an embedding mechanism/process to define latent vector representations, as described below.

In the present example, intermediate signal InD1 may be directly concatenate with intermediate signal InS1 and InS2, the low-dimensional representations of corresponding sparse inputs Sparse-1 and Sparse-2. For example, Concatenation block Cnct_1 may directly append its inputs InS1 and InS2 to the end of its input InD1. The resultant concatenated input InCnct may then be applied to an MLP neural network (or other ML model) in a manner similar that described above. That is, input InCnct may be applied to a first input layer InL_1, which in turn may relay it to a first hidden layer HL_1 in a series of hidden layers of an MLP neural network.

In particular embodiments, preprocessing blocks PreS1 and PreS2 may convert their respective sparse inputs, Sparse-1 and Sparse-2, to corresponding low-dimensional representations (e.g. latent vector representations), InS1 and InS2, by applying an embedding process (or graph embedding), which may use a corresponding embedding matrix for each category of entity or item that is represented by sparse inputs. That is, a sparse input, Sparse-1 or Sparse-2, may include a list of IDs, where each ID may identify a non-zero entry in sparse input. In preprocessing, each ID in the sparse vector may be replaced by (or otherwise converted to) an embedding (e.g., a low-dimensional feature (dense) vector) that conveys a semantic meaning to that ID. Determination of the conveyed semantic meaning, and thus the embedding, is dependent upon how the neural network is trained. That is, the embedding matrices may be comprised of feature weights (e.g. parameters), and the embedding matrices and other parameters (e.g., link weights and node weights) of the (MLP) neural network may be learned jointly by back-propagation, or other suitable neural network training process.

In general, graph embedding aims to embed a graph into a Euclidean space so that each node in the graph has a coordinate. There are various graph embedding algorithms known in the art, and typically they differ in what properties one wishes to preserved during the embedding. For example, Isomap is a nonlinear dimensionality reduction method that embeds the graph that most faithfully preserves the shortest distance between any two nodes in the graph, while Laplacian Eigenmaps is a method that preserves proximity relations, mapping nearby input nodes to nearby outputs, and Maximum Variance Unfolding aims to map high dimensional data points to low dimensional embeddings while preserving certain properties about the manifold during the embedding. Irrespective of the graph embedding method, the obtained embeddings may be used in a wide range of applications such as visualization, classification or heuristic searches. That is, embedding an entity results in a vector representation of that entity within the defined vector space, which permits semantic or heuristic meaning to be extracted from different entities based on their embeddings (vector relationships) within the defined vector space.

Figure 4:
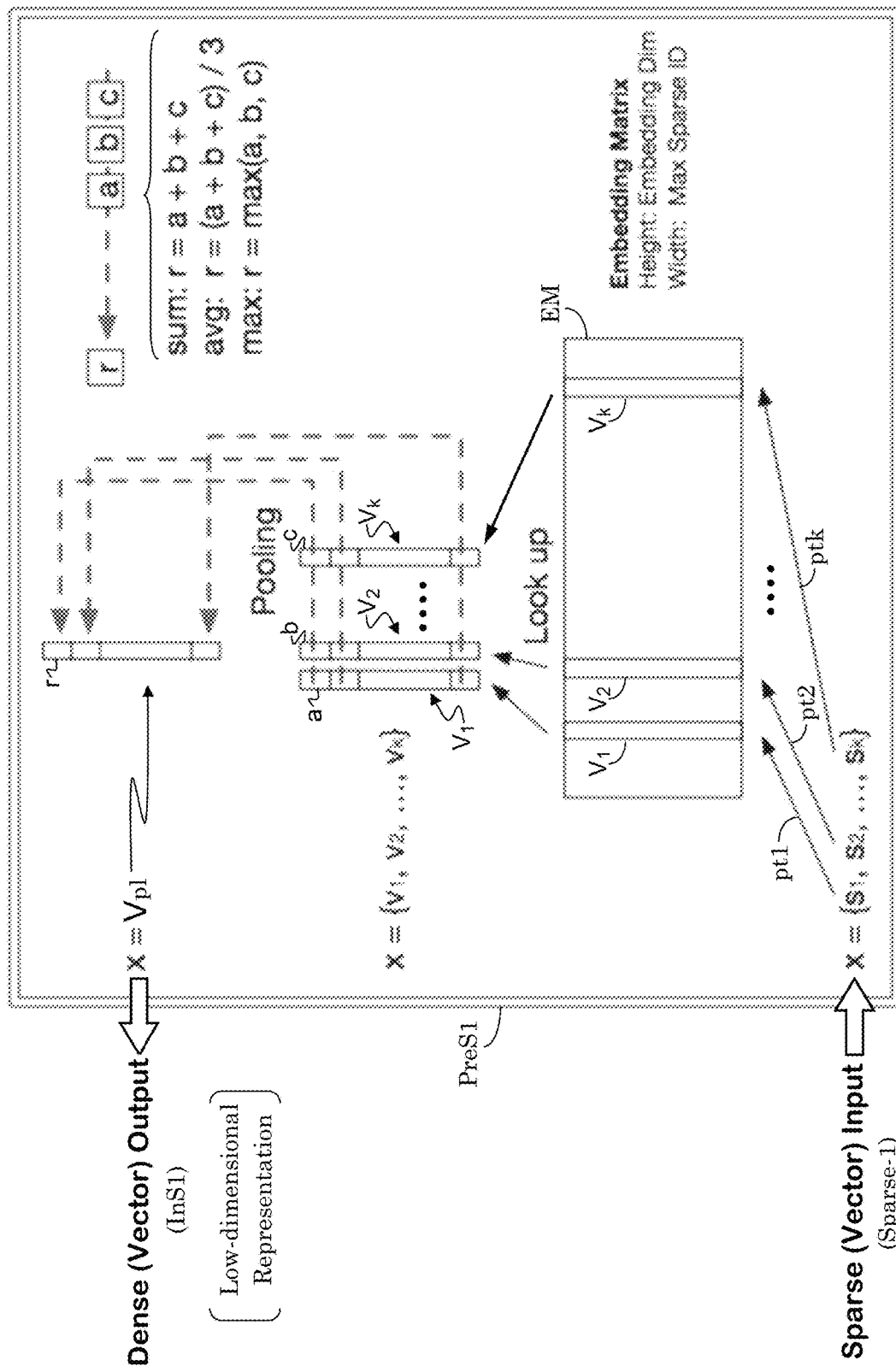
FIG. 4 illustrates an example embedding and pooling technique.

FIG. 4 illustrates an example embedding and pooling technique. Optionally, preprocessing blocks PreS1 and PreS2 may each implement the embedding and pooling technique of FIG. 4 to convert their respective sparse input, Sparse-1 or Sparse-2, to corresponding low-dimensional representation, InS1 or InS2. For ease of discussion, the EP block of FIG. 4 is shown as being implemented by preprocessing block PreS1, but it is to be understood that the same EP block may likewise be implemented by preprocessing block PreS2 of FIG. 3.

In the present example, the input to PreS1 is illustratively shown receiving a sparse (vector) input (e.g. Sparse-1). In particular embodiments, a preprocessing block PreS1 or PreS2 may alternately receive a dense vector. As is explained above, sparse inputs may be used to represent category information related to a user, or circumstance, such as visited webpages, frequency of webpage visits, clicked advertisements, submitted preferences, etc. Thus the present approach provides for category embedding, and thereby can provide insight into category similarities. That is, with embedding, similar categories may be mapped to nearby regions in the resultant embedding space. The model learns a numerical embedding (e.g., parameter weights) for each category of a categorical feature, based on all categories in the embedding space, which permits visualization of relationships between categories and thus permits extraction of similarity-knowledge between categories based on geographic relationships within the embedding space.

As is also explained above, a sparse vector may include a series of indexes pointing to selections from a larger list, and each index's assigned value. In the present case, input Sparse-1 (relabeled as generic indicator "X" within preprocessing block PreS1) may include a list of IDs, as described above, which are illustratively identified as a series of "k" IDs: $S_1, S_2, \ldots, S_k$. In the present case, each ID entry may include a corresponding pointer index (pt1, pt2, ..., ptk) pointing to a selection option, or category, within an embedding matrix EM. The embedding matrix EM may assign a vector representation $(V_1, V_2, \ldots, V_k)$ of fixed dimension (e.g., 32 cells/dimensions in each vector representation). Consequently, embedding matrix EM may have a height equal to the embedding dimension (e.g. dimension size of assigned vector representations, e.g., 32 cells/dimensions long) and a width equal to the number of possible object/feature selections (e.g. the maximum number of available IDs to select from). After embedding, the series of IDs $(S_1, S_2, \ldots, S_k)$ of input "X" may each be individually replaced by a series embedding vector representations $(V_1, V_2, \ldots, V_k)$, such that after embedding, X may be defined as $X=\{V_1, V_2, \ldots, V_k\}$.

At this point, the embeddings $(V_1, V_2, \ldots, V_k)$ of the input IDs/features $(S_1, S_2, \ldots, S_k)$ may be submitted to a pooling stage, which may down-sample the multiple embeddings into a single representative vector. That is, the pooling stage may convert the series of embedding vector representations $(V_1, V_2, \ldots, V_k)$ into a single pooled vector, Vpl, having the same dimension as the embedding vector representations. In this manner, the pooling stage creates a single low-dimensional vector (e.g., Vpl) of the entire, original input Sparse-1. In effect, pooling reduces the amount of data flowing through a neural network (ML model), and may thereby decrease the computational cost of the neural network. Basically, pooling may be a way to define a compact representation of the input (e.g., Sparse-1) to the EP block by aggregating the embeddings (e.g., the embedding vector representations) of the input. It is noted that the input may be any dimension, e.g., Sparse-1 may have any number of IDs in its lists of ID's.

The aggregating of the different embeddings may be achieved by applying an element-wise (dimension-wise) operation on corresponding elements of each embedding, as indicated by dotted lines in FIG. 4, to define the pooled vector Vpl. For ease of discussion, the present example may assume that input Sparse-1 has only three IDs in its list of IDs, e.g. it is assumed that "k" is 3 in FIG. 4. That is, the element-wise (e.g., bi-gram) pooling technique may be applied to top cell "a" of embedding $V_1$, to top cell "b" of embedding $V_2$, and to top cell "c" of embedding $V_k$ to define the top cell "r" of pooled vector Vpl. The same pooling technique may be applied element-wise on the next cell in the embedding vector representations, and so on until all cells of the embedding vector representations have been processed, and pooled vector Vpl fully defined. Multiple linear pooling techniques are known in the art, and FIG. 4 illustrates three optional techniques. That is, typical linear pooling techniques (operations) may include summation pooling (element-wise summation of the embeddings), average pooling (the element-wise averaging of the embeddings), or max pooling (taking the greatest element-wise value in the embeddings). Other pooling techniques may include geometric pooling and multiplicative pooling, but these pooling techniques may require additional computational resources.

Although pooling may provide a computational advantage for processing a large number of embeddings, some information may be lost during the aggregation process. The present disclosure therefore provides optional improved pooling methods that may reduce the loss of information. One such method is attention based pooling. In this case, the aggregation process may be improved by paying more attention to (e.g., weighing more heavily) related information based on a current "context." In the present case, sparse inputs may provide contextual information, some of which may be emphasized. For example, larger weights may be placed on more important ID in the sparse input (e.g., webpages that are visited more often than other webpages) in the case of linear pooling. More useful information may thereby be preserved in the final compact representation of each entity. As is explained above, the embeddings may be a series of weights, and so individual embeddings that correspond to more important IDs may be assigned higher weights (or the original embedding weights may be increased by an additive or multiplicative weight).

Thus, the "context" of the sparse input may be important in the attention based pooling. If a sparse ID is not informative in any "context", the present sparse neural network model (SparseNN) may, for example, simply learn zero embedding for it (e.g., learn zero (value) weights for its embedding), but if a sparse ID does inform a context (e.g., provide additional contextual, or implicit, information related to the context), then the interaction between the "context" and Sparse IDs may be important. For example, if the "context" corresponds to a user, and it is desired to pay more attention to (emphasize) a certain webpage_id when modeling this user because this user engaged (e.g., liked, commented on, visited, etc.) more than a threshold number of times with this webpage_id, then a bigger weight may be assigned to the embedding of this webpage_id irrespective of the webpage_id's contents/characteristics. Thus, prior to embedding, the list of IDs in a sparse input may be sorted by perceived contextual information (e.g., popularity or interest to the user), and the embedding may be emphasized (adjusted) based on the position of each ID in the sorted list of IDs. For example, the order of a coefficient_page_id feature (e.g. a webpage ID) may be decided based on a coefficient score, which may be based on more detailed user's engagement history with a webpage. Thus, a basic attention based pooling method may be termed "position-based weighted pooling", and it may use the order/position of a sparse ID (e.g. an ID in a list of IDs of a sparse input) as conveying interaction information between a given "context" and the sparse ID. This method may be effective in ads click-thru-rate (Ads CTR) mobile feed data applications.

As is described below, the present disclosure further provides for embedding of dense vector inputs along with sparse vector inputs. That is, dense inputs may also be submitted to an EP block, such as illustrated in FIG. 4, or other suitable EP architecture. For a dense vector, linear pooling (element-wise pooling, such as described above) may be used so that the EP block may be similar to a linear fully-connected layer. Embedding dense inputs along with sparse inputs in the construction of the embedding space may provide for more relational information between the two types of inputs.

Figure 5:
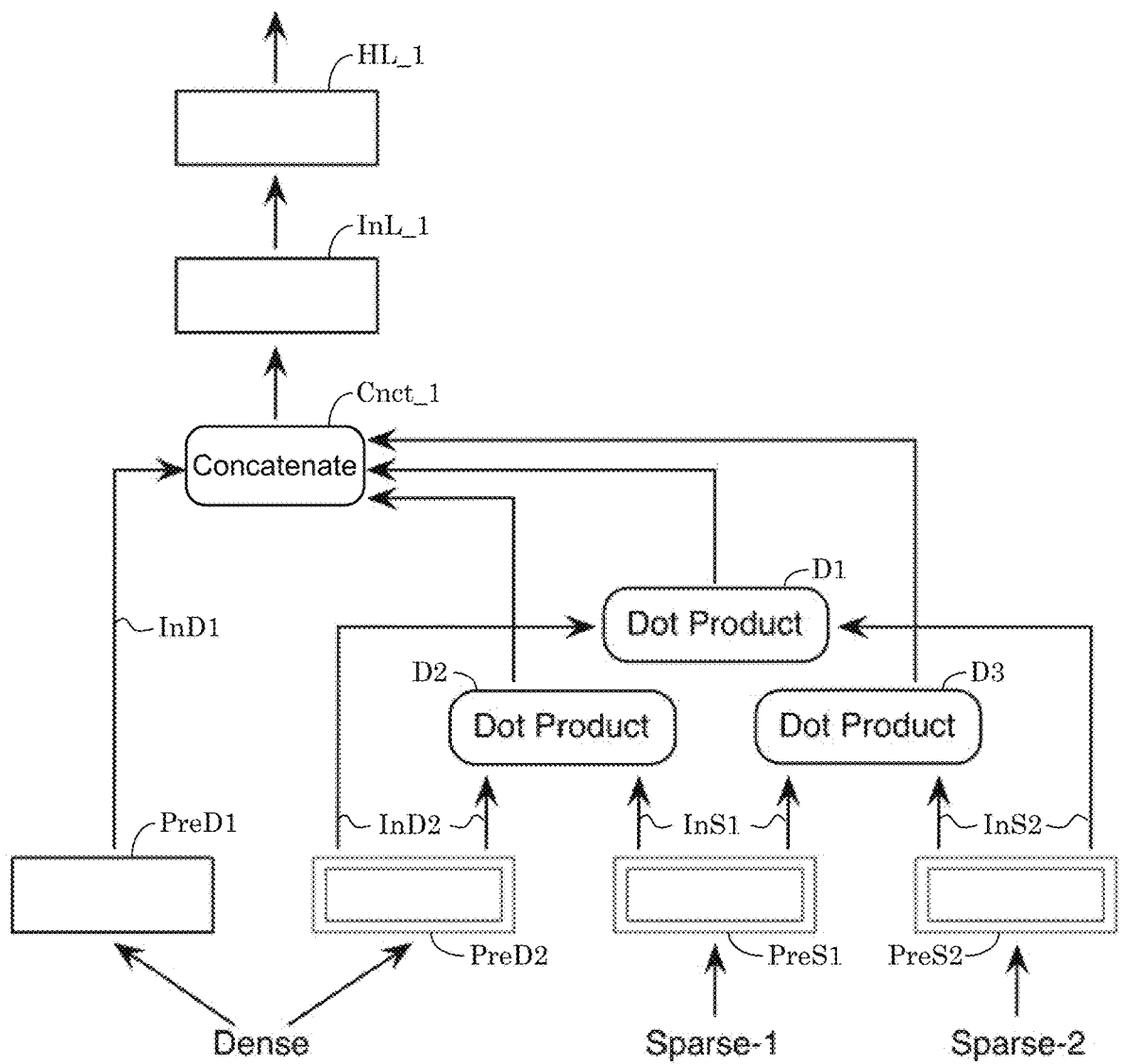
FIG. 5 illustrates an embodiment with combined embedding and pooling of both dense input(s) and sparse (inputs).

FIG. 5 illustrates an embodiment with combined embedding and pooling of both dense input(s) and sparse input(s). Elements in FIG. 5 similar to those of FIG. 3 have similar reference characters and are described above. Like before, sparse (vector) inputs Sparse-1 and Sparse-2 may be submitted to preprocessing blocks PreS1 and PreS2, which may apply embedding and pooling to create intermediate outputs Ins1 and Ins2, respectfully. As is explained above, both preprocessing blocks PreS1 and PreS2 may use the same architecture, such as illustrated in FIG. 4, for example. Like in the case of FIG. 3, the dense (vector) input "Dense" may be applied to a passive preprocessing block PreD1, which may convey input "Dense" to its intermediate output InDl. In the embodiment of FIG. 5, however, the dense input "Dense" may also be applied to a second preprocessing block PreD2 that may convert the original dense input to a lower-dimensional (dense) representation. In the present example, preprocessing block PreD2 may transform input "Dense" to intermediate output InD2 of equal dimension as the intermediate outputs of preprocessing blocks PreS1 and PreS2. In particular embodiments, preprocessing block PreD2 may apply an embedding and pooling process similar that of preprocessing blocks PreS1 and PreS2 to define intermediate output InD2. Alternatively, preprocessing block may use a transformation method other than embedding, to define the lower-dimensional representation of input "Dense," but may still use a pooling process to define the final, single vector InD2 of equal dimension as InS1 and InS2.

Unlike the embodiment of FIG. 3, where the low-dimensional representations (e.g., pooled latent vectors produced by the preprocessing blocks are directly concatenated to the original dense (vector) input (e.g., InD1), the present embodiment may model pairwise interactions between respective latent vectors, InD2, InS1, and InS2. Combined representation of latent vectors may be obtained by dot product or cosine similarity, both of which may provide an explicit way to model pairwise interactions between different features. In the example of FIG. 5, pairwise interactions are modeled, as an example, by obtaining the dot product of every unique pairwise combination of low-dimensional representations InD2, InS1 and InS2, as indicated by dot product blocks D1, D2, and D3. The dot products results may then be concatenate to the original dense input, InD1, by concatenation block Cnct_1, and fed forward into the subsequent ML model layers (e.g., InL_1 and Hl_l of an MLP neural network), as explained above. Both the embeddings and weights may be jointly learned through back-propagation as explained above, or by another known learning (training) method.

In this manner, latent (or semantic) meanings of the sparse inputs that are more closely related to the dense input(s) may be obtained. That is, dense features may provide stand-alone characterizations of a user (e.g., is the user online or offline), and the pairwise modeling of dense feature with the sparse features my more closely relate the sparse features to those stand-alone characterizations. For example, a sparse feature may indicate an ad that a user may be likely to select, but if a dense feature indicates that the user is offline, then the combination of the two vectors may indicate that the user is less likely to select the ad when the user is offline than when the user is online. In essence, the dot products may provide a measure of synergy between features (dense or sparse).

Although the dot-product may be an economic way to capture bi-gram interaction (interactions between two adjacent (e.g. corresponding) elements in two feature vectors), the dot-product may lack the ability to model higher-order interactions (consideration of relationships among four or more variables). For example, FIG. 5 shows three inputs (Dense, Sparse-1 and Sparse-2), but the number of inputs may be in the order of hundreds, thousands, or millions, which may pose practical problems. If additional inputs were incorporated to the embodiment of FIG. 5 (e.g., if additional preprocessing blocks were arranged laterally in FIG. 5), the number of dot product combinations required to consider all unique interaction pairs between inputs may grow in proportion to the square of the number of inputs. That is, the number of dot products needed for a given number of n inputs may be $(n^2-n)/2$, which may place a practical limit on the embodiment of FIG. 5.

Figure 6:
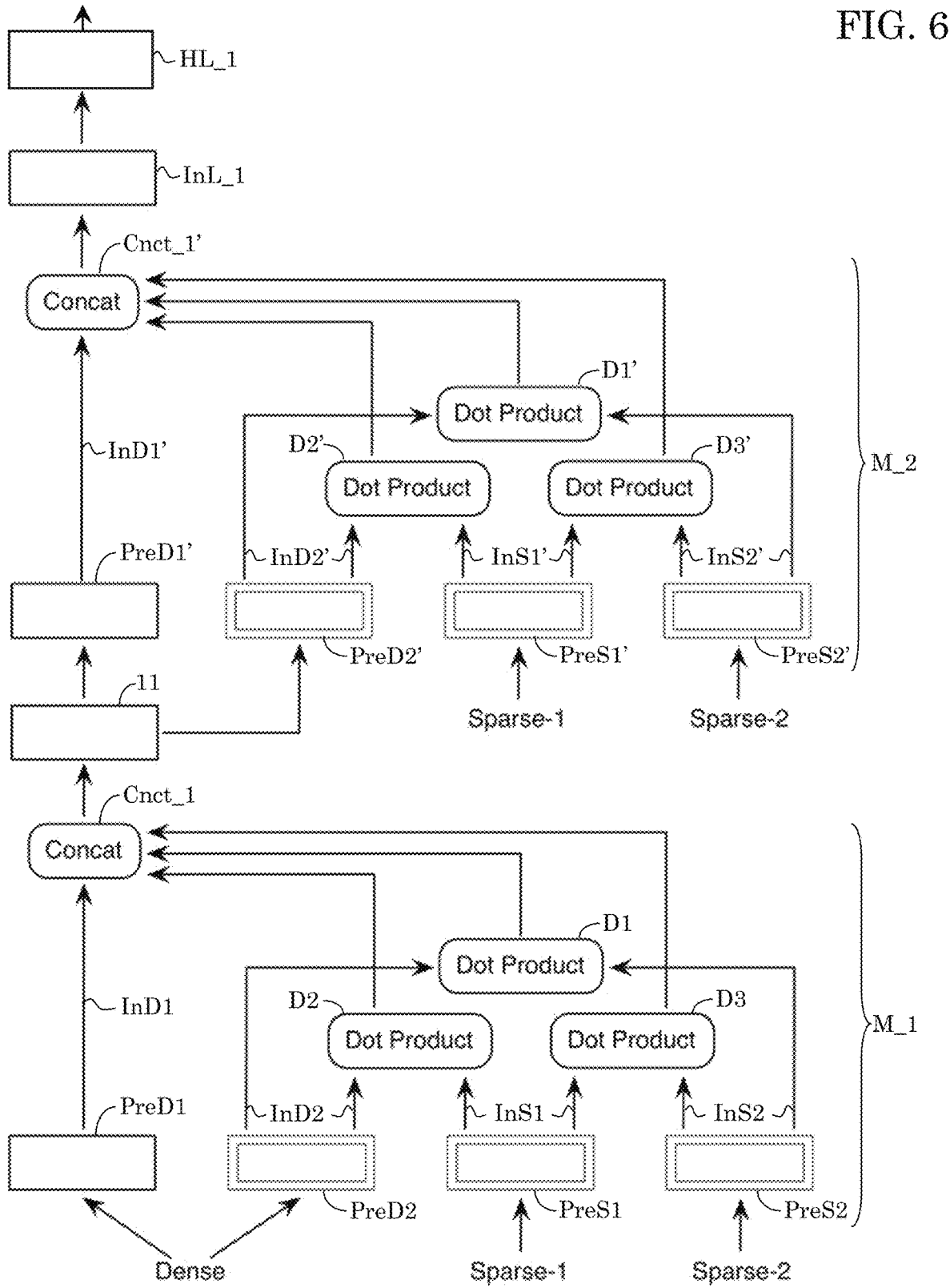
FIG. 6 illustrates a nesting architecture to model higher-order interactions between features.

FIG. 6 illustrates a nesting architecture that may facilitate modeling of higher-order interactions between features. As mentioned above, the embodiments of the present disclosure include a nested architecture and a mixed architecture, both of which may be modularized and combined. Elements in FIG. 6 similar to those of FIG. 5 have similar reference characters and are described above. The present nested architecture model may infuse additional relationship information among multiple inputs (e.g. categories, sparse inputs, dense inputs, etc.), and provide for higher order relationships between a multitude of inputs.

Unlike the ML model of FIG. 3, where low-dimensional representations of sparse inputs may be directly concatenated to a dense input to define a combined vector, the present embodiment provides for more explicit (direct) ways to model pairwise interactions between different features. That is, the present ML model of FIG. 6 provides for combined representations of multiple inputs. Again, the dense input "Dense" may be submitted to a preprocessing block PreD2 (EP block) that may be the same, or similar, as the preprocessing blocks, PreS1 and PreS2, to which sparse input(s) (e.g., Spasrse-1 and Sparse-2) are submitted, and a combined representation may be obtained between every combination of the dense input and one, two, or more sparse inputs. In the present embodiment the combined representations may be obtained by use of the dot product, but other methods of modeling pairwise interactions between different features, such as cosine similarity, may be used.

Like in the ML model of FIG. 5, the present approach of FIG. 6 provides explicit modeling of pairwise interactions between different features, and may be used with MLP ML models that may be limited to a small number of neural network (hidden) layers (e.g. 128, 64, 32, or fewer layers). For example, if explicit modeling of pairwise interactions were omitted, and the inputs were simply concatenated as in FIG. 3, then the MLP ML model may require a larger number of neural network (hidden) layers (e.g. 512, or more layers) to learn the embeddings and MLP weights (parameters or gradients). Thus, the present architecture(s) may improve the MLP's capacity to learn using fewer neural network layers. As it would be understood, a smaller MLP may be faster to train and may require lower computer processing resources. Thus the present model(s) may provide a direct processing advantage over other methods. This may be of particularly importance in some time-critical applications, such as ads click-through-rate (CTR) prediction tasks, which may typically have low latency requirements.

The nesting architecture of FIG. 6 provides for multiple preprocessing modules, M_1 and M_2, which may include generating low-dimensional representations of input vectors, pairwise interaction modeling, and combining of interim outputs. Although only two preprocessing modules, M_1 and M_2, are illustrated, it is to be understood that three or more preprocessing modules may be implemented, with each preprocessing module having three or more inputs. In the example of FIG. 6, both preprocessing modules M_1 and M_2 each are shown to receive the same sparse inputs Sparse-1 and Sparse-2. In the approach of FIG. 6, lower preprocessing modules (e.g., M1) may be thought to capture bi-gram interactions, and the higher preprocessing modules (e.g., M2) may be thought to learn higher order interactions based upon them. This may provide improved predictions. Optionally, different EP blocks in different preprocessing modules may assign a different embedding to the same inputs. Additionally, different preprocessing modules may receive at least one different input. Although the general structure of each preprocessing module, M_1 and M_2, may be similar, the reference characters identifying internal elements of preprocessing module M_2 are differentiated from those of preprocessing module M_1 by the addition of an apostrophe to indicate that they may not necessarily be implemented the same. For example, if preprocessing block PreS1' (of M_2) assigns a different embedding to its input, Sparse-1, than preprocessing block PreS1 (of M_1) assigns to its input, Sparse-1, then the low-level representation intermediate output InS1' of block PreS1' (within M_2) may be different than the low-level representation output InS1 of block PreS1 (within M_1).

In the example of FIG. 6, the output of preprocessing module (e.g., M_1) goes through block 11 prior to entering a next preprocessing module (e.g., M_2) in sequence. Block 11 may be a passive layer and convey the output of concatenation block Cnct_1 of preprocessing module M_1 to preprocessing blocks PreD1' and PreD2' of preprocessing module M_2. Alternatively, block 11 may implement a hidden layer, such as block HL_1.

Figure 7:
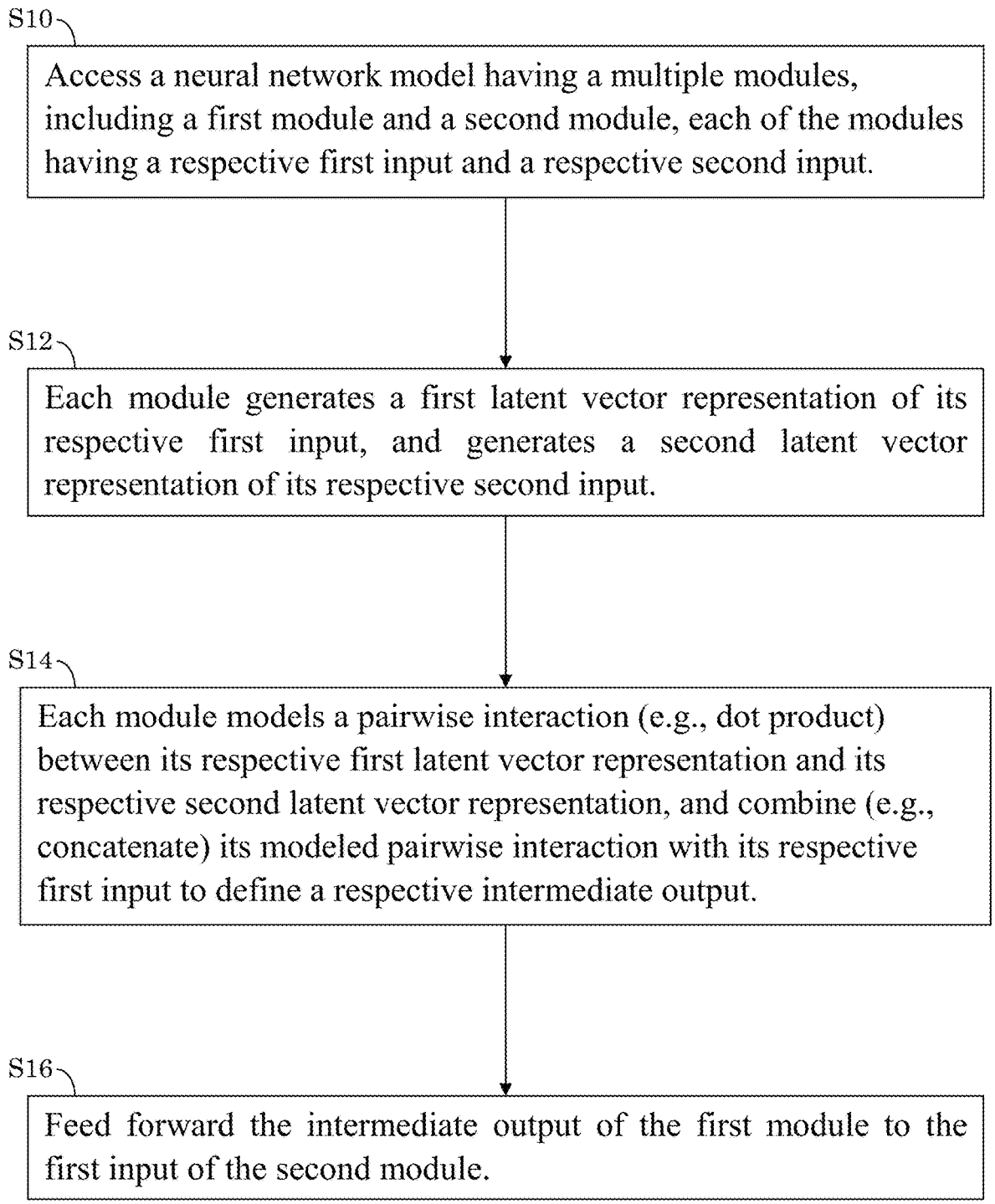
FIG. 7 illustrates an example method for a nested architecture ML model.

FIG. 7 illustrates an example method for a nested architecture ML model. In step S10, a computing device (e.g., a Facebook server) may access a neural network model having a multiple preprocessing modules, including a first module (e.g., M_1) and a second module (e.g., M_2). Each of the preprocessing modules may have a respective first input (e.g., a dense input) and at least one respective second input (e.g. a sparse input such as Sparse-1 and/or Sparse-2). In step S12, each module (e.g., M_1) generates a first latent vector representation (e.g., embedding-pooling intermediate output InD2) of its respective first input (e.g., input Dense), and generates a second latent vector representation (e.g., InS1 or InS2) of its respective second input (Sparse-1 or Sparse-2, respectively). In step S14, each module (e.g., M_1) models a pairwise interaction (e.g., by dot product block D2) between its respective first latent vector representation (e.g., Ind2) and its respective second latent vector representation (e.g., InS1), and combine (e.g., by concatenation block Cnct_1) its modeled pairwise interaction (e.g., output from D2) with its respective first input (e.g., input Dense) to define a respective intermediate output (e.g., output from concatenation block Cnct). In step S16, the intermediate output (e.g., output from concatenation block Cnct) of the first module (e.g., M_1) is fed forward to the first input (e.g., input of blocks PreD1' and PreD2') of the second module (e.g., M_2).

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for a nested architecture ML model including the particular steps of the method of FIG. 7, this disclosure contemplates any suitable method for a nested architecture ML model including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

In the architecture of FIG. 5, a single embedding (or latent vector, which has inherent data or inferable data) may be learned for each sparse feature, and the dense feature(s) may be projected into the same vector space (embedding space) as the sparse inputs before doing pairwise interactions (e.g. dot-products). It has been found, however, that it may be beneficial to provide multiple embeddings (feature representations) for some features (sparse or dense input(s)). That is, some features may convey more than one contextual meaning, and their different meanings may need to be evaluated (learned) within the context of their interactions with other features. As an analogy, one may consider a word that has multiple meanings depending upon a context in which it is used. For example, the word "bank" may mean a financial institution in a first context, or a rising of ground bordering a body of water in a second context, or a land formation having a steep slope in a third context, etc. In order to capture different contextual meanings of a feature within the context of its interactions with other features (which themselves may have different contextual meanings), it has been found that interactions between different pairs of features may require different embeddings (different underlining feature representations), which put emphasis on different aspects of a signal (or signal source from which the embedding is defined). Herein, this learning of a mixture of different embeddings of input features may be termed a mixed architecture (neural network).

Figure 8:
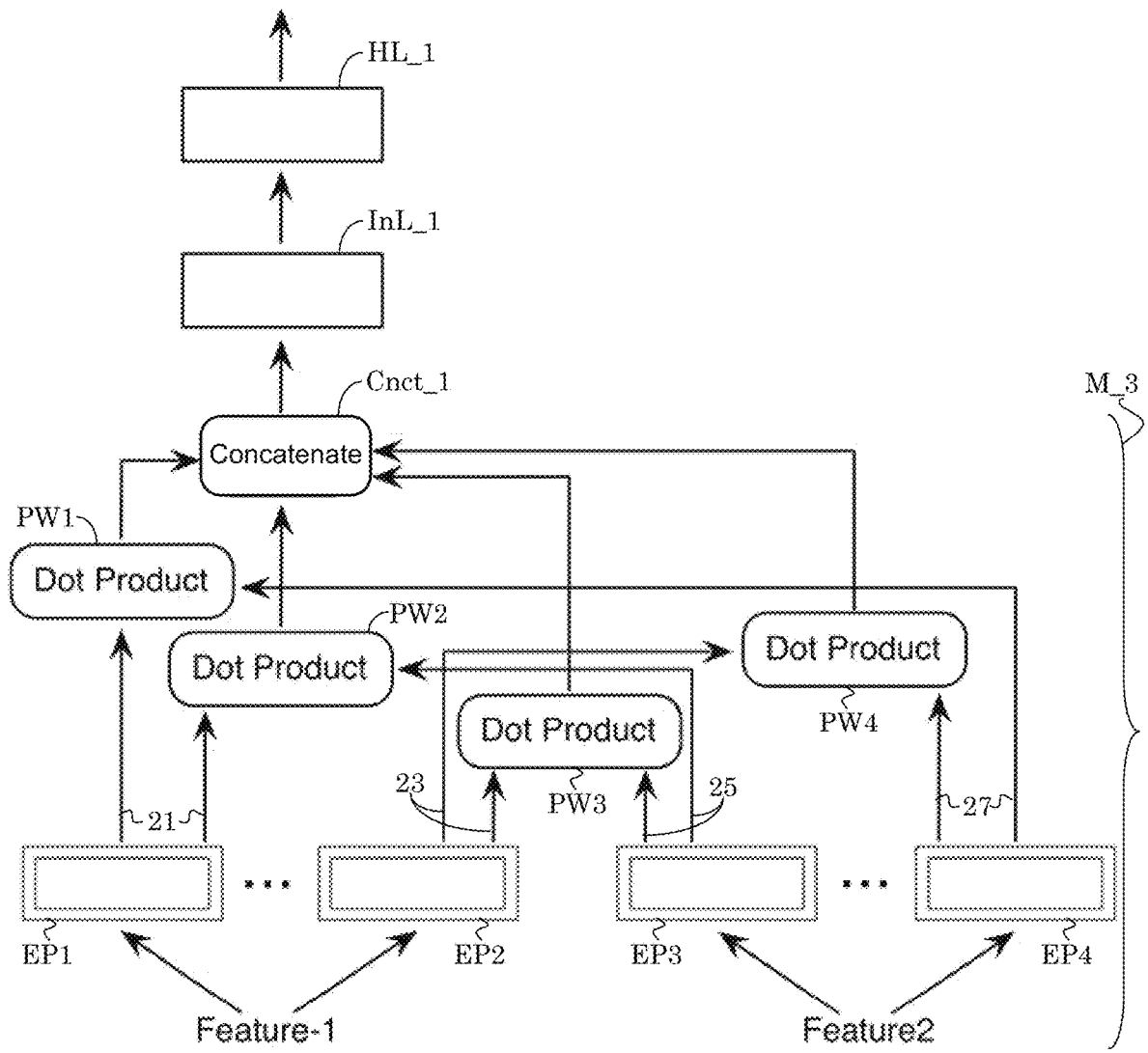
FIG. 8 illustrates an example mixed architecture neural network.

FIG. 8 illustrates an example mixed architecture neural network. In the present example, the same feature input (e.g. Feature-1 or Feature-2), which may be a sparse input or dense input, may be submitted to more than one preprocessing embedding-pooling block (e.g., EP1/EP2 or EP3/EP4), each of which provides a different embedding (latent vector) to its respective input. Elements in FIG. 8 may be similar to those of FIGS. 3-6, but have different reference characters to emphasize that a single input (e.g. Feature-1) may receive multiple different embeddings by means of being submitted to multiple different embedding-pooling blocks (two or more preprocessing blocks) within the same preprocessing module, M_3. That is, in the present example, input Feature-1 may be submitted to two preprocessing blocks EP1 and EP2, each of which may provide a different embedding, and their respective pooling therefore provides different intermediate outputs, 21 and 23, respectively. Similarly, a second input Feature-2 may be submitted to two embedding-pooling preprocessing blocks EP3 and EP4, each of which may provide a different embedding and different pooled output, e.g., 25 and 27, respectively. It is to be understood that additional contextual meanings may be defined by submitting the same input (e.g., Feature-1) to additional embedding-pooling preprocessing blocks (3 or more), each of which may provide a different embedding to the same input. Pairwise interactions between (optionally all) unique combinations of the intermediate outputs of (optionally all) the preprocessing blocks (e.g., EP1 to EP4) may then be modeled by pairwise modeling blocks (e.g. PW1 to PW4). The outputs from the pairwise modeling blocks (e.g. PW1 to PW4) may then be combined by block Cnct_1 and submitted to a subsequent neural network layer (e.g., InL_1) or to another preprocessing module in a manner similar to that of FIG. 6. In the present example, pairwise modeling blocks PW1 to PW4 may each apply a dot product to their inputs, and block Cnct_1 may combine its inputs by concatenation.

The mixed architecture of FIG. 8 provides for learning a mixture of latent vectors (embeddings) for each feature, and between each pairwise interaction of features (e.g. pairwise interactions of each of the features' multiple embeddings). In the present example, the pairwise interactions are provided by dot-products, but other feature interactions may be used, such as cosine similarity. Like is explained above, all the weights may be learned by the MLP by backpropagation, or other known method. In this way, multiple topics (or multiple semantic meaning categories) may be learned for each feature. Additionally for each pair of entities (e.g. each pairwise combination), the model can learn to put more weight (e.g., higher value weights) on suitable topic(s), e.g., more relevant feature combination(s).

This mixed architecture can be applied to both dense and sparse features. That is, the inputs to the mixed architecture may be dense features, sparse features, or a combination of both. In practice, it has been found that dense features typically require a larger number of different representations to be learned. That is, dense features may comprise a larger number of different contextual meanings as compared to sparse inputs. This may be due to dense features typically being comprised of a collection of different signal sources (e.g. information categories such as gender, Wi-Fi-status, time-of-day, historical data, etc.).

Optionally in embodiments, rather than submitting a dense feature to multiple embedding blocks to obtain multiple low-dimensional representations, linear transformations (such as by use of matrices) of the dense feature may be used to define its multiple low-dimensional representations. However, multiple representations of sparse inputs may be obtained by free-form embeddings, which produces multiple different embeddings for a sparse input. If desired, multiple representations of a dense feature may also be obtained by free-form embedding, as well.

In particular embodiments, the preprocessing blocks (e.g. EP1-EP4), pairwise combination blocks (PW1-PW4), and concatenation block Cnct_1 of FIG. 8 may constitute a preprocessing module, M_3. That is, the mixed architecture of FIG. 8 may be arranged into a nested architecture as illustrated in FIG. 6 by replacing at least one preprocessing module (e.g., M_1 or M_2) in FIG. 6 with M_3 of FIG. 8, or by adding the preprocessing module M_3 to the sequence of preprocessing modules of FIG. 6.

Figure 9:
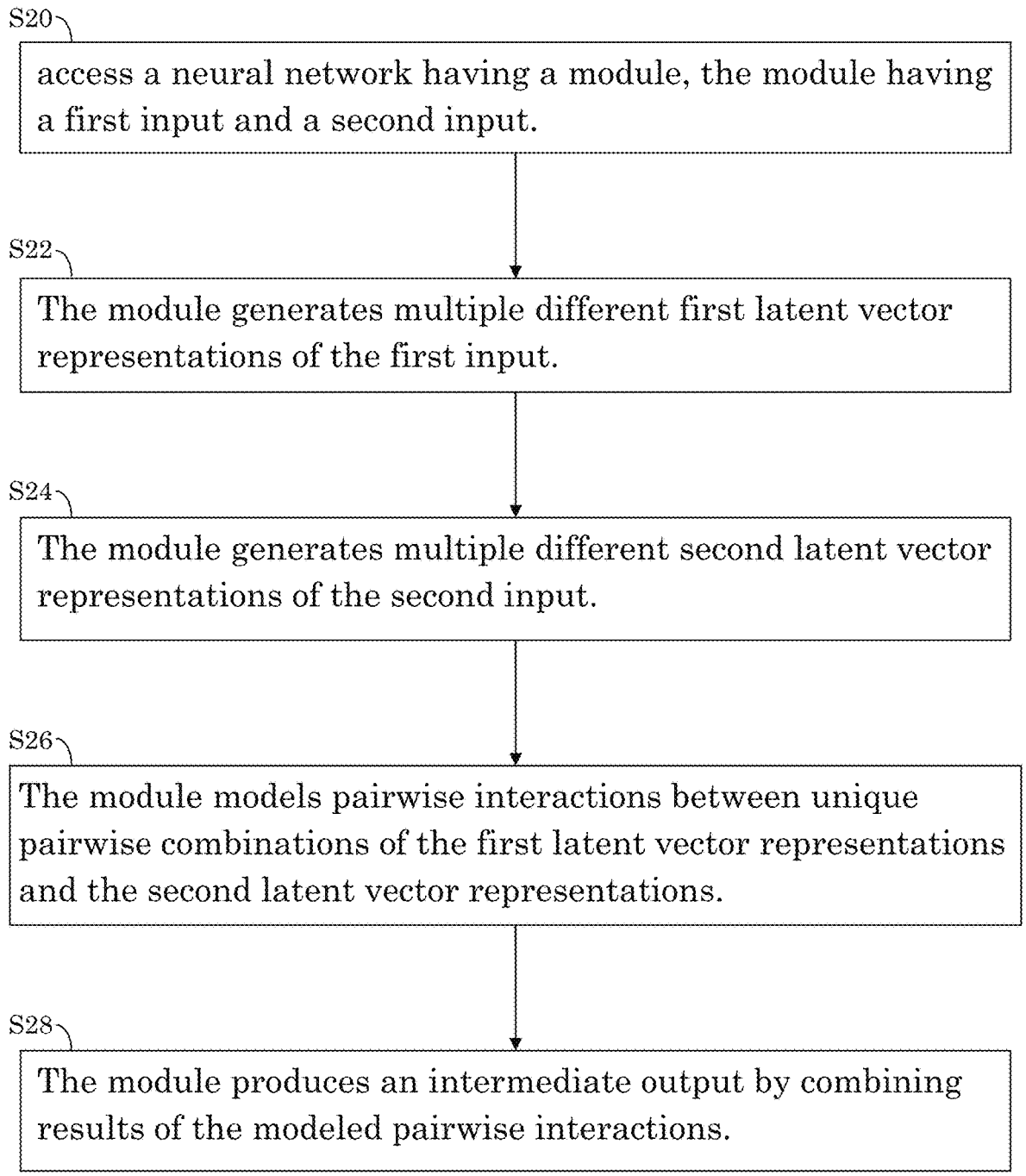
FIG. 9 illustrates an example method for a mixed architecture neural network.

FIG. 9 illustrates an example method for a mixed architecture neural network. In step S20, a computing device (e.g., Facebook server) may access a neural network having a (preprocessing) module, and the module (e.g., M_3) has a first input (e.g., Feature-1) and a second input (e.g. Feature-2). In step S22, the module generates multiple different first latent vector representations (e.g., embeddings, or output 21 from EP1 and output 23 from EP2) of the first input (e.g., Feature-1). In step S24, the module generates multiple different second latent vector representations (e.g., embeddings, or output 25 from EP3 and output 27 from EP4) of the second input (e.g., Feature-2). In step S26, the module models pairwise interactions (e.g., by blocks PW1-PW4) between unique pairwise combinations of the first latent vector representations and the second latent vector representations. In step S28, the module produces an intermediate output by combining results of the modeled pairwise interactions (e.g., the output of concatenation block Cnct_1).

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for a mixed architecture neural network including the particular steps of the method of FIG. 9, this disclosure contemplates any suitable method for a mixed architecture neural network including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Training the above-described ML model embodiments may pose practical challenges. To address some of the computational challenges to ML model training, below is disclosed a two-tier distributed method/system that may utilize multiple processors (CPUs or GPUs), or processing cores, for better computational capability.

As an example, a two-tier hierarchical hybrid training method/system running on multiple computer processors (e.g., GPUs or CPUs) in a single machine (computer) is presented. The hybrid training method/system may incorporate different aspects of EASGD and Hogwild training techniques. In particular embodiments, the ML models may be used to model deep personalization, e.g., to identify personalize predictions catered to individuals. A difficulty may arise because deep personalization models may be relatively small (e.g., have 128, 64, 32, or fewer hidden layers). Parallel and distributed training, in general, require communication and synchronization among multiple workers (processing threads), but deep personalization training may be much more sensitive to communication or synchronization overhead (e.g. data/network traffic congestion) due to its relatively small kernel, or model, size. That is, a typical method to speed up the training of deep personalization models may be to process multiple work threads in parallel, but since the models are relatively small, delays caused by the passing of data between work threads may offset any speed benefits gained from parallel processing.

Before discussing some of the features of the present embodiment, it may be beneficial to first provide some background information regarding the training of an ML model. As is stated above, an NN ML model may be trained by backpropagation. Stochastic Gradient Descent (SGD) may be used to optimize a neural network using backpropagation to find minima or maxima (e.g., parameter solutions) by updating each iteration with a different batch or "mini-batch" of samples of a training dataset (training inputs and corresponding training outputs). Interim gradient values (e.g., interim parameter values) may be calculated during each iteration pass. The SGD process is inherently linear and difficult to parallelize, but there are a couple of techniques that introduce some level of parallelization to SGD, with some limitations.

One technique is Elastic Averaging Stochastic Gradient Descent (EASGD), which is suitable for very large NN models (typically using dense features) such as deep image recognition. EASGD divides a large model into a few parts/threads (each with its own local (weight) parameters). Each part is assigned to a different concurrent process (local worker, or thread) that maintains its own local parameters. A central master machine or processing block maintains a master parameter list/store that is updated as a moving average over the local parameters computed by local workers. Because the local workers maintain their own local memory, and do not work directly with the master parameter store, their local parameters develop elasticity, meaning that they can fluctuate further from the master parameters. The idea is that EASGD enables the local workers to perform more exploration, where the amount of elasticity/exploration is controlled by the amount of communication between the local worker and the central master.

A GPU may have a large number of small CPUs (e.g., processing cores) that may function in parallel, and is thus well-suited for large (floating point) computations. Because of the large model size that EASGD is designed to work with, EASGD is well suited for multi-GPU implementations. When implementing EASGD in a multi-GPU environment, typically one assigns one worker/thread per GPU in order to fully utilize the GPU's large number of processing cores. After some predefined number of operations, each GPU, in turn, gains lock access to the master parameter store, and is synchronized with the master parameter store, which may be maintained in a designated one of the multiple GPUs. By locking the master parameter store, only one GPU may access the master parameter store at a time.

Although the use of GPUs for large neural networks is attractive because of its capacity for large computation, it is not well-suited to smaller NN models. The ML models of particular embodiments may include deep personalization model, whose size is much smaller than deep image recognition, and which may not fully utilize the multiple processing cores in a GPU, resulting in wasted resources. Consequently, implementing an ML model of some of the present embodiments in a multi-GPU environment using a typical EASGD technique is not effective. Additionally, because of the smaller size of the present model(s), updating of interim parameter values with a master parameter store would be needed more frequently. This would result in increased communication traffic within a GPU or across GPUs (such as to transmit parameter updates), and delays introduced by the increased communication traffic may nullify gains obtained from the GPU's computation capacity.

Another technique for introducing parallelization to SGD is a technique known as Hogwild. In Hogwild, multiple processors have access to a shared memory without locking the shared memory. This introduces the possibility of overwriting each other, but it has been shown that this approach may still converge to a solution when used with sparse features, which are typically found in smaller NN models. That is, Hogwild is conventionally limited to sparse features and small NN models. In particular embodiments, however, the ML models of the present disclosure may include dense inputs and may be larger than is conventionally used with Hogwild.

Thus, the neural network models of particular embodiments may be too large for a typical Hogwild implementation and too small for a typical EASGD implementation.

To address these challenges, the present hierarchical two-tier training architecture may combine features from Hogwild and EASGD in a training system running on one or more production GPU (or CPU) servers. Optionally, each production server may have multiple processors. For example, each production GPU server may typically have up to 8 GPU cards. That is, the training architecture, which may support a combination of dense (input) features and sparse (input) features, may draw benefits from both Hogwild and EASGD techniques and be successfully integrated into a multi-processor (e.g., multi-GPU) environment.

A first tier of the present hierarchical two-tier training architecture may address an architectural implementation within a single GPU of the present multi-GPU implementation. Within a single GPU (or CPU), data parallelism may be increased by launching multiple model training threads, or training workers, or user streams. Communication delays and synchronization costs between training workers, such as described above, may be reduced by introducing additional communicator workers (or communicator threads) dedicated to handling communication, e.g. data transfers. For example, communicator workers may handle communication between each training worker and a fast shared memory within the single GPU without locking the shared memory, or may handle communication across multiple GPUs. That is, the training workers may synchronize their parameters with the local shared memory in a lock-free manner. Lock free access to the local shared memory within a single GPU may provide some of the speed advantages of Hogwild. Unlike Hogwild, however, the present training system/method is further spread across multiple GPUs as part of the present hierarchical two-tier training architecture. In essence, each GPU may have an extra communicator worker to communicate and exchange information between multiple GPUs. As another example, a single GPU may have a total of 50 to 100 workers running, but only 4 to 8 workers may be communication workers involved in (e.g., solely dedicated to) communication, or cross-GPU communication. Optionally, cross-GPU communication may rely on shared GPU-Direct memory access, which may be relatively fast.

A second tier of the present hierarchical two-tier training architecture may address an architectural implementation across multi-GPUs. For multiple GPUs within the same server, parallelism may be increased by splitting the parameter (e.g., weight or gradient) data across the multiple GPUs, with each of the multiple GPUs holding its own local parameter data, as stated above regarding the first tier of the present hierarchical two-layer training architecture. A master parameter list may be held remote from the multiple GPUs, and routinely separately updated by each of the multiple GPUs, in turn. Alternatively in particular embodiments, one of the multiple GPUs may be designated to hold the master parameter list, and the remaining of the multiple GPUs may routinely updated their local parameter data to the master parameter list.

Modern GPUs (or GPU-based cards) may have a large number of processing units (small CPUs or cores or single instruction multiple data (SIMD) cores). For example, the NVidia Corporation's Kepler K40 GPU-based card has a total of 2880 SIMD cores, and the NVidia Corporation's Maxwell M40 has a total of 3072 SIMD cores. Deep personalization may have a relatively small kernel, or model size, (as compared to other ML models, like deep image), which may not be enough to fully utilize the processing units in a modern GPU-based card.

Figure 10:
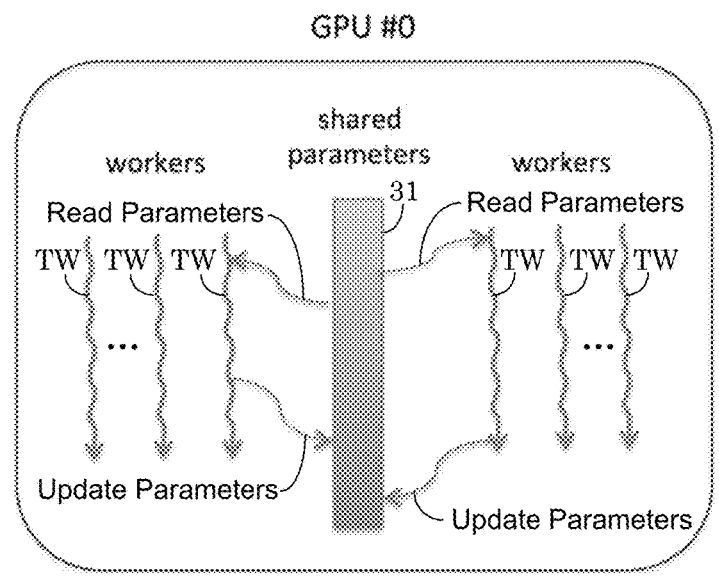
FIG. 10 illustrates an arrangement of multiple workers and a local, shared parameter memory within a single GPU.

FIG. 10 illustrates an arrangement of multiple training workers TW and a local, shared parameter memory 31 within a single GPU. To increase the throughput and utilization of available resources (e.g. the large number of internal cores) within a single GPU, multiple training workers TW (usually 10 to 30 workers) may be launched in a form of CUDA (Compute Unified Device Architecture) user streams, which can run concurrently on the same GPU. CUDA is a parallel computing platform and application programming interface (API) for use with NVidia Corporation GPU-based graphics cards. Each training worker TW may process its own copy (or part) of the present ML models (e.g., a deep personalization ML model). In the present parallel process of FIG. 10, each training worker TW may process a separate batch of input samples and execute a training pass (e.g., iteration) independently. The different trainer workers TW may use a shared set of training parameters maintained in shared memory 31 on the same GPU, which may be accessed without lock. Every training worker TW may update the shared parameters in shared memory 31 without accessing/releasing a lock in a lock-free manner (so potentially they may overwrite each other's results). However, it has previously been shown in work related to Hogwild's lock-free memory access, that under certain conditions such as in a sparse update pattern, the overwriting may be rare and lock-free access is likely to converge to an answer. The present within-GPU parallelism approach has likewise been found to have good convergence in practice for the present deep personalization applications, and potentially be very efficient with virtually no (or minimal) communication and synchronization overhead.

In practice, several optimizations were made in order to maximize the speedup of the present GPU-based trainer. For example, based on CUDA profiling, it was found that some user streams (training workers) were being blocked by a default stream (a CUDA operational setting) for some operations. The present training workers were optimized to avoid using the default stream. In addition, all memory copies between CPU and GPU were made asynchronous using a pinned memory, to faceplate the implementation of parallel copying and training processes.

The present single-GPU application may provide improved speed performance, but if the Hogwild-like approach were to be spread across multiple GPU, the amount of speed improvement may be minimal. A reason may be that cross-GPU memory access may be much slower than memory access within a single GPU. For example, with production K40 or M40 servers, the within-GPU memory access can reach speeds of up to 200 GB/s while the cross-GPU memory access may be up to 10 GB/s, or about a 20× slower. So, when every training worker TW needs to access a shared cross-GPU memory (memory located in a remote GPU) during training, the communication overhead simply dominates and the resulting speed-up from 8 GPUs may be only marginally better than the single-GPU case.

In order to avoid this communication overhead, a different parallel training architecture for cross-GPU operations is presented as the second tier in the present hierarchical two-tier trainer architecture. That is, the first tier addresses implementation within a single-GPU, and the second tier addresses implementation across multiple processors (e.g., multiple GPUs or CPUs).

Figure 11:
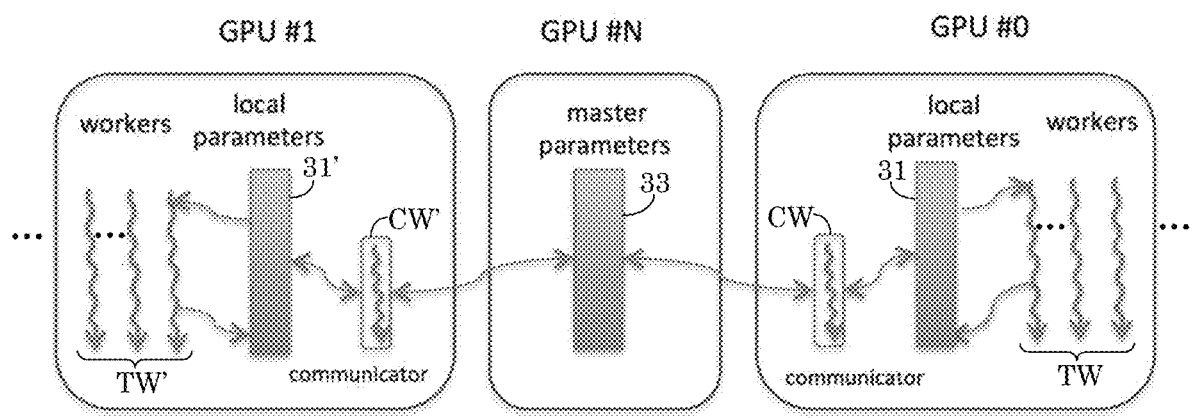
FIG. 11 illustrates an example implementation of a hierarchical two-layer (or two-tier) trainer.

FIG. 11 illustrates an example implementation of a hierarchical two-tier trainer. All elements in FIG. 11 similar to those of FIG. 10 have similar reference characters and are described above. Inside each (trainer) GPU (e.g., GPU #0 and GPU #1), which corresponds to the first tier, there may be multiple training workers (TW and TW') executing a Hogwild-like application as described above in reference to FIG. 10. Within each (training) GPU, GPU #0 or GPU #1, its respective training workers, TW or TW', access only their respective local shared memory 31 or 31', which resides on the same GPU and avoids all cross-GPU memory accesses. As part of the second tier, each (training) GPU (GPU #0 and GPU #1) may have at least one additional special (communicator) worker (CW and CW', respectively) responsible for synchronizing its local copy (31 and 31', respectively) of (weight) parameters with a master copy memory 33, which may be remote from either of GPU #0 and GPU #1. That is, the communicator worker may be (solely) in charged (and dedicated to) data transfer between a GPU and a remote master parameter memory 33. Optionally, the master parameter memory 33 may be maintained in another GPU (e.g., GPU #N). Periodically, the local shared memories 31 and 31' from local worker GPUs (GPU #0 and GPU #1) may separately be exchanged and mixed with the master parameter memory 33, which may be based on a concept of elastic differences as used, for example, in EASGD explained above. In the present two-tier architecture, only a small number of (communicator) workers (usually 4 to 8 workers out of the 50 to 100 workers) experience the cross-GPU communication overhead, while the training workers only access the local shared memory.

The first tier addresses implementation within each individual GPU, but ML Model data is split across multiple GPUs. In order to make use of the many cores within each GPU, the ML model data of each GPU is further divided into multiple (50-100) model threads (training workers) to run in parallel. Rather than assigned each training worker its own local memory like in EASGD, all the workers within a GPU share a common local memory without lock, which provides some of the speed benefits of Hogwild. However, whereas in Hogwild the shared memory would be the master memory, in the present case, the shared memory of a GPU is a local partial parameter memory (like in the multi-GPU implementation of EASGD) and the master memory is maintained at an external location.

In summary, the second tier addresses the management of the multiple GPUs (two or more) and the management of a master parameter memory. One of the GPUs (GPU #N) may be designated to hold the master parameter memory 33. At predetermined times (e.g., after a predefined number of backpropagation integrations), each GPU, in turn, synchronizes its local parameter memory (e.g. 31) with the master parameter memory 33. During synchronization with a given GPU (e.g. GPU #0), the master parameter memory 33 is locked from access from any other GPU (e.g. GPU #1). In this manner, the master memory may be updated as a moving average over the local parameters computed from the multiple GPUs, which provides some of the elasticity benefits of EASGD.

In order to mitigate delays due to cross-GPU communications, each training GPU may further be augmented with a small group of communicator workers CW (e.g., 4 to 8) dedicated to synchronizing a GPU's local parameter memory (e.g., 31) with the master parameter memory 33. In this manner, the GPU's other (50-100) training workers, or model threads, (e.g., TW) are not interrupted by the synchronization of their shared local parameter memory (e.g., 31) with the master parameter memory 33.

In practice, it was found that the mixture of EASGD techniques and Hogwild techniques had convergence problems (difficulty finding parameter solutions). In an example implantation, convergence problems were traced to some hyper-parameters (operational settings) related to the EASGD algorithm. The problem was resolve by adjusting these operational settings and fine tuning the learning rate of the NN model. To remove the convergence problems, the EASGD operational settings were modified to increase the moving rate, lower the Nesterov momentum, and decrease the communication period.

Figure 12:
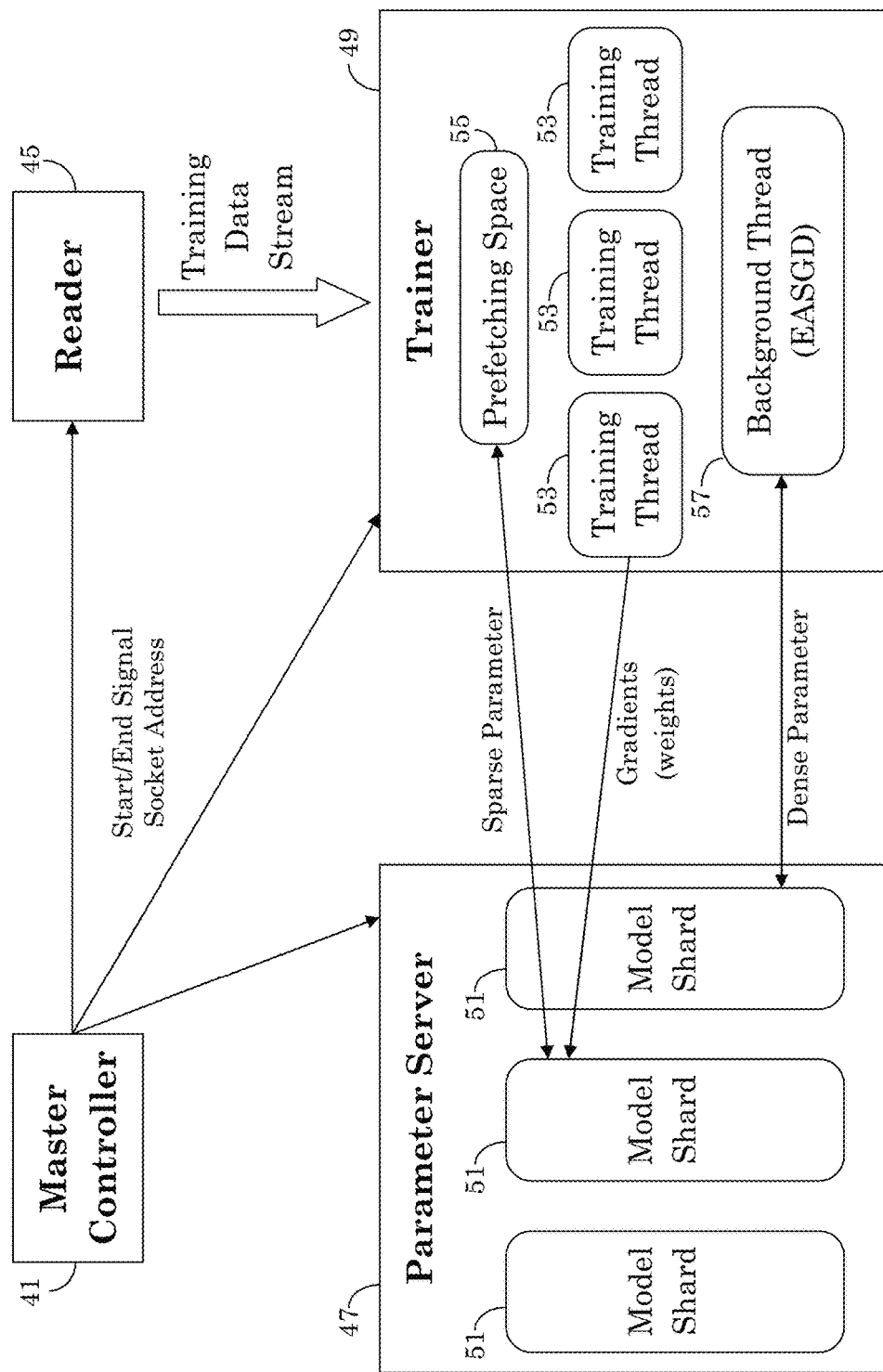
FIG. 12 illustrates another example training system for training an ML model.

FIG. 12 illustrates another example training system for training an ML model. FIG. 12 shows a master controller 41, a reader machine 45 that may pre-fetch training data, a parameter server 47, and a trainer machine 49, all of which may communicate with each other over a computer network. The example of FIG. 12 incorporates features of asynchronous SGD to a combined Hogwild-EASGD architecture, an example of which is provided above in reference to FIGS. 10 and 11. Asynchronous SGD is a scalable method of distributing SGD across multiple processors. The basic approach of Asynchronous SGD is to divide training data into a number of subsets, and to use each subset to train a separate full copy of an ML model. The multiple ML models communicate parameter (weight) updates through a centralized parameter server (which keeps the current state of all parameters for the ML model) sharded across many machines. That is, each machine that makes up the parameter server holds a separate shard (piece or part) of the total parameters. For example, if one has 10 parameter server shards, each shard is responsible for storing and applying updates to 1/10th of the total ML model parameters.

By contrast, in the present approach, the training data is not divided, but a single ML model may be divided into multiple parallel processing streams, as explained above. Additionally, the present approach may shard a master parameter store across multiple machines, which may be updated asynchronously.

As stated above, GPU machines (machines that may have many small processor cores in a graphic processing unit) may be used to handle preprocessing work. In particular embodiments, GPU machines may be identified as "readers". The preprocessed data from the GPU machines may be streamed to CPU machines (machines that have one or more dedicated, multi-purpose CPUs) that process the received preprocessed data (e.g., train the NN ML model using backpropagation) to extract information, such as inferences between input data terms (features). In particular embodiments, CPU (or GPU) machines may be termed "readers" or "trainers", depending upon their primary use. In general, "reader" machines stream their output to "trainer" machine.

In an example embodiment, aspects of asynchronous SGD may be applied to some of the preprocessing work. Firstly, parameters may be sharded (divided into subsets or model shards) across multiple machines 51 of a parameter server 47 (or across multiple parameter servers 47), which communicate with one or more "trainer" machine 49. In addition to holding a model shard 51, the parameter server(s) 47 may further provide embeddings (e.g., they may hold embedding tables) for input features (dense or sparse), and if a resulting, active embedding is large (e.g., an input vector had a large number of cells (e.g., greater than 64) resulting in a larger number of embeddings, e.g., one embedding per cell), the parameter server 47 may further reduce the size of the overall embeddings by applying pooling across the embeddings, as explained above (see FIG. 4). If the embedding is small (e.g., not greater than 64), the parameter server 47 may send the active embeddings to the trainer machine 49, where they may be pooled into a smaller size, as explained above. A reason for selectively pooling either on the parameter server 47 or on the trainer machine 49 may be to reduce data traffic on the computer network. The trainer machine 49 may combine pairs (e.g., unique pair combinations) of pooled features by dot product, or other combining method (see FIGS. 4-6 and 8). Alternatively, if the data size after pooling at the parameter server 47 is still determined to be large, e.g., within a predefined size range, the parameter server 47 may combine pairs of pooled features by dot-product and send the resultant vector to trainer machine 49.

The trainer machines 49 may use local workers (e.g., training threads) 53 to process data and compute local gradients on a mini-batch; for example in a manner as explained above in reference to FIGS. 10 and 11. The workers 53 may send (push) gradient updates to corresponding model shards 51 in parameter server 47, which process the updates asynchronously. When needed, the workers 53 may pull parameters back from the parameter server 47. The master controller machine 41 may coordinate multiple trainers 49 and parameter servers 47. The reader machine 45 may pre-fetch data (e.g., training data) to the training machine(s) 49, which may forward the received training data (or a part of the received training data) from, for example, a prefetching space 55 to the parameter server 47 for preprocessing (e.g., embedding, pooling, applying dot-products, etc.), if necessary.

In an example implementation, the trainer machine(s) 49 may implement Hogwild, and periodically (e.g., after each pass/iteration, or after a predefined number of passes/iterations) push their gradient changes/updates to the appropriate model shard 51 in the appropriate parameter server 47. That is, each trainer 49 may have access to all model shards 51 in all the parameter servers 47, and may address a parameter server 47 in accordance with the parameter shard 51 that needs updating.

Like in the Mixed Hogwild/EASGD case described above, the Hogwild trainers 49 may maintain a local parameter memory (for example shared local parameter memory 31 in FIG. 10) and the parameters servers 47 may maintain the master parameter memory (similar to master parameter memory 33 in FIG. 11) in shards 51 averaged across multiple Hogwild trainers 49 so that they function in a manner similar to EASGD. Additionally in the embodiment of FIG. 12, the trainers 49 may further dedicate a small group of workers (similar to communicator workers CW of FIG. 11) to synchronizing their local parameter memory with the master parameter memory (shards 51) in the parameter server(s) 47. The trainer machines 49 may further have background threads 57 that may apply EASGD to dense features (dense inputs) and update dense parameters in appropriate model shards 51, as needed. The trainers 49 may be implemented in dedicated CPUs or in GPUs (e.g., in CPU-based machines or GPU-based machines).

Master controller machine 41 may help manage the interactions or data flow between the machines. Master controller 41 may function as a leader machine that provides basic cross-machine communication primitives, such as a global signal, a global barrier and a global counter. The other machines, such as reader 45, trainer 49 and parameter server 47, and other workers, may use it as a central service to wait for signals generated by the other machines or gather information, such as socket addresses, from other machines. Master controller machine 41 may also help to properly manage the ending of a data stream between machines (e.g. participants in the data stream). For example, when a first participant finishes a data stream operation (e.g., finishes data reading or writing) with a second participant, the first participant may write as signal indicating that it has finished to master controller machine 41. The second participant in the data stream operation may check this signal in master controller machine 41 when the data stream has been empty for a predefined period of time.

Optionally, reader machine(s) 45 may provide filtering and sharding logic that may help stream different data to different machines or stream duplicate data to multiple trainers 49. In this manner, multiple trainers 49 may share data. The parameter server 47 may optionally also have a separate, dedicated thread (worker thread) for each of model shard 51 handling both pull and push request to avoid using any lock (e.g., memory lock).

In a particular embodiment, a basic operation of trainer 49 may include, for each mini-batch (e.g. training data received from reader 45): pull parameters from parameter server 47 if necessary; run forward and backward pass for the model and get gradients; update local model (e.g. a shared memory 31, as in FIG. 10); and send (at least updated) gradients to parameter server 47. Push and pull operations (to/from parameter server 47) may be done in a asynchronous fashion, or may also be done after a predetermined number of mini-batches. Alternatively, the local parameters may be locally kept within a trainer 49 and synchronized with parameter server 47 less frequently. This approach may be applied to sparse or dense features, but sparse features that appear frequently may become stale more quickly. In particular embodiments, this method may be limited to dense features.

As explained above, the trainer 49 may implement a Hogwild-like approach similar to that described in FIG. 10, which means that multiple training threads 53 share a local memory, not shown. Additionally to obtain some of the benefits of EASGD, the background thread 57 may provide dedicated data communication service (similar to communicator worker CW in FIG. 11) to manage updates to the master parameter memory, which in the present embodiment may be embodied by the collection of model shards 51.

Figure 13:
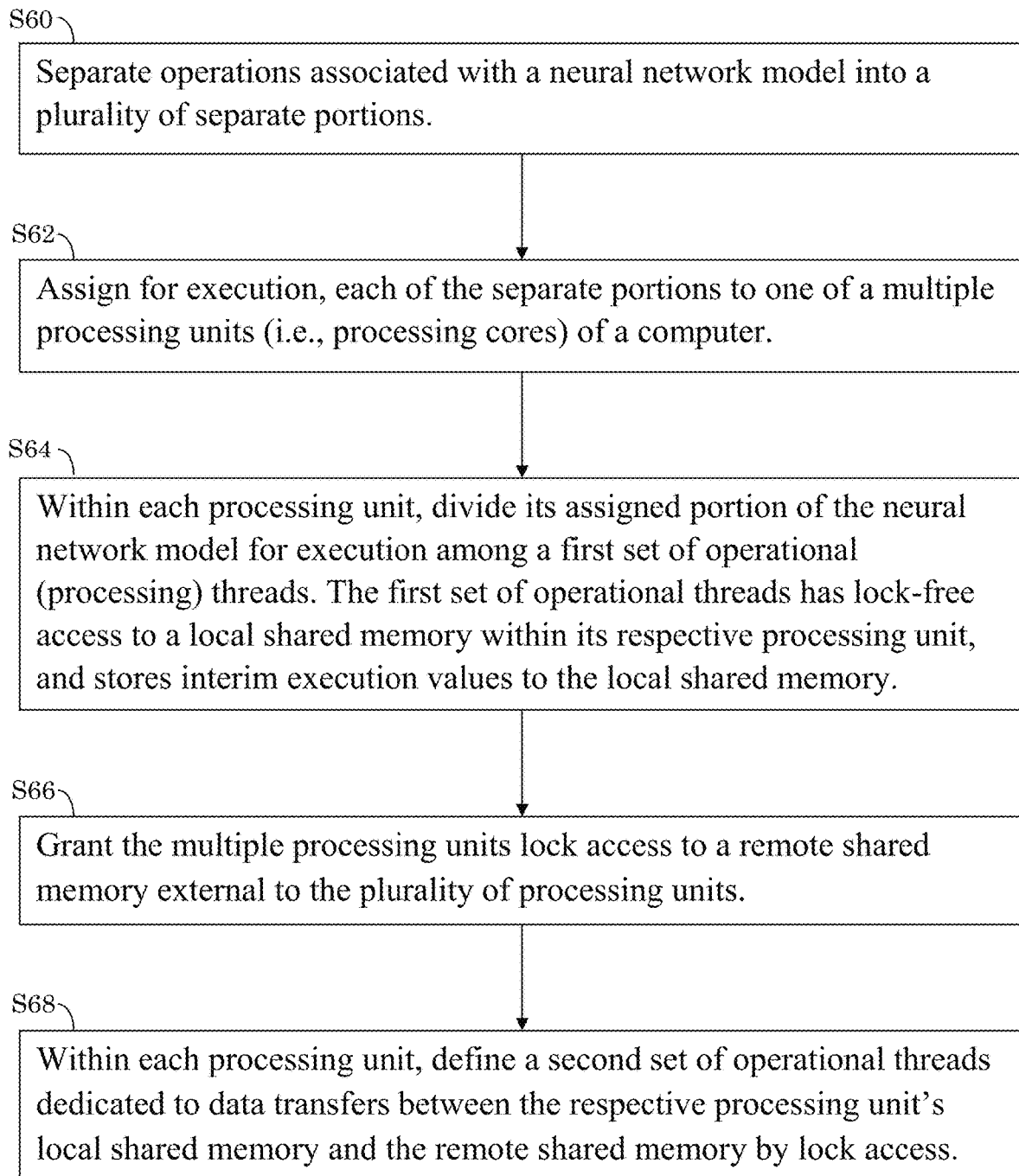
FIG. 13 illustrates an example method for a training system to train an ML model.

FIG. 13 illustrates an example method for a training system to train an ML model. In step S60, operations associated with a neural network model are separated into multiple separate portions. In step S62, each of the separate portions is assigned for execution to one of a multiple processing units (e.g., GPU #0 and GPU #1) of a computer. In step S64, within each processing unit (e.g., GPU #0), divide its assigned portion of the neural network model for execution among a first set of operational (processing) threads (e.g., TW). The first set of operational threads (e.g., TW) has lock-free access to a local shared memory (e.g., 31) within its respective processing unit (e.g., GPU #0), and stores interim execution values to the local shared memory. In step S66, the multiple processing units (e.g., GPU #0 and GPU #1) are granted lock access to a remote shared memory (e.g., 33) external to the plurality of processing units. In step S68, within each processing unit (e.g. GPU #9), define a second set of operational threads (e.g., CW) dedicated to data transfers between the respective processing unit's local shared memory (31) and the remote shared memory (33) by lock access.

Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for a training system to train an ML model including the particular steps of the method of FIG. 9, this disclosure contemplates any suitable method for a training system to train an ML model including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

After the ML model has been trained, the implementation of an ML model having both dense inputs and sparse inputs, as described above, may benefit from additional optimization for an operational stage. As is explained above, in particular embodiments, the ML models may include a combination of user features (e.g., dense features) and semantic features (sparse features) that may be related to particular user features. The sparse features may effectively represent a candidate item (e.g., an ad, newsfeed item, etc.) that may be of interest to the user, and execution of the ML model may identify which candidate item(s) (among multiple available candidate items) may be of most interest to the user. In particular embodiments, each ML model may consider a user input (or request) and one (or a small number, e.g. not more than 10) of the available candidate items as an information pair (more specifically, as user/request-and-candidate item pair), and provide a prediction value (e.g., probability value) for this particular pair, which may then be compared with prediction values of other pairs to identify the optimal pair(s) having the highest prediction values. Therefore multiple instances of the ML model may be executed to consider multiple user/request-and-candidate item pairs to consider multiple candidate items, or to consider multiple candidate items for multiple different users. Additionally as explained above, the sparse inputs may need embedding to define latent vectors, and although the embeddings will have already been defined (e.g., embedding matrices will have been trained), large memory capacities may be needed to store the trained embedding matrices. Also is as explained above, the user features (e.g. dense inputs) may be large and require high computing capacity to process. Because of the large size of user features, the transfer of many user features across a computer network may introduce data-transfer congestion into the computer network. Thus, the processing of an ML model that combines dense feature inputs and sparse feature inputs may place conflicting hardware requirements on system architecture. Below is presented a system architecture that addressed some of the practical hardware difficulties of executing an ML model in accord with particular embodiments, and in particular with an ML model that has a combination of dense feature inputs and sparse feature inputs.

In particular embodiments, computer processing of a trained (Sparse NN) ML model may be split between at least one local machine and at least one remote machine, over a computer network. The local machine, which may be a local ranking machine (e.g., a Facebook server), may be characterized by a computer architecture that emphasizes computational power over memory availability. The remote machine (e.g., another Facebook server), which may be a back-end service such as remote predictor (or a parameter server), may be characterized by a computer architecture that emphasizes memory storage capacity over computational power. In addition to differences in computational resources, the local machine and the remote machine may have access to different data sets (e.g., the local machine may have access to (e.g., receive as input) user features and the remote machine may have access to (e.g., store) trained embedding matrices). Output results of the remote machine may then be sent to the local machine, where they may be merged with outputs from the local machine according to the trained (Sparse NN) ML model.

Figure 14:
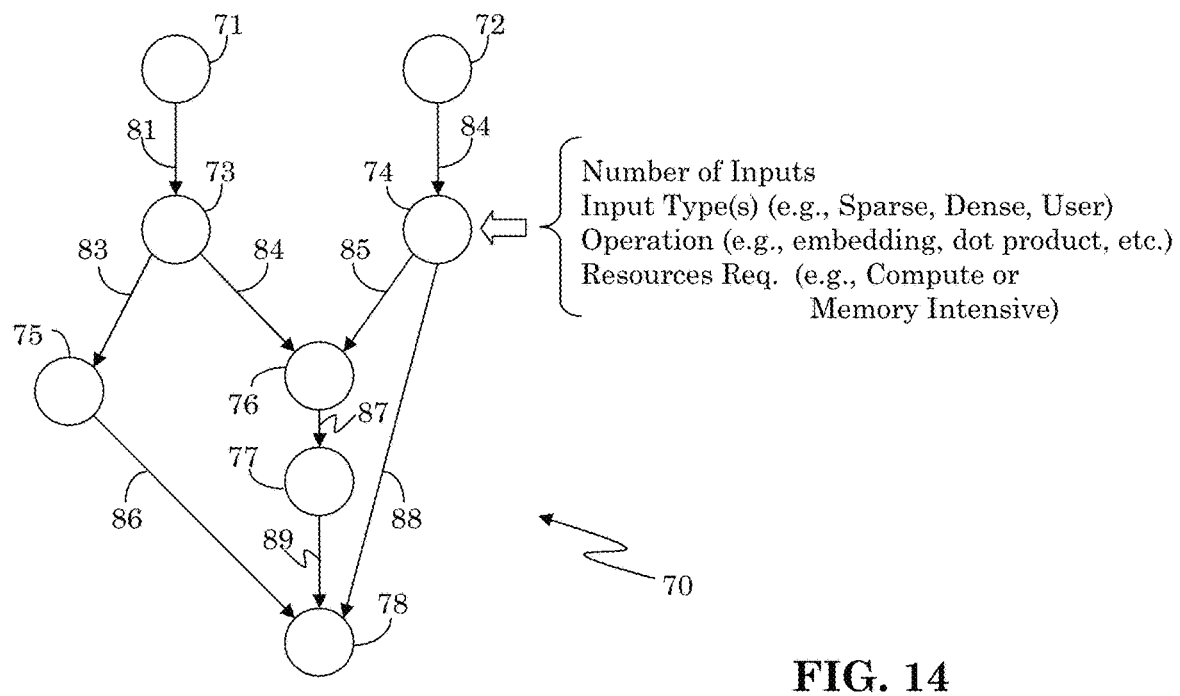
FIG. 14 illustrates an example operation nodal model, e.g., a nodal graph model of a trained (NN) ML model.

FIG. 14 illustrates an example, simplified, operation nodal model 70, e.g., a nodal graph model of a trained (NN) ML model. After an ML model (such as described above in particular embodiments) has been trained (such as described above), and the ML model parameters (e.g. weights/gradients) have therefore been determined/learned, the trained ML model may be converted to one (or more) operational nodal model(s) 70. The operational nodal model 70 may break down the trained ML model into discrete operations sequences. Each operation (or optionally related group of operations) may be designated a node (e.g., 71 to 78) in an operational nodal model 70, with links (interconnections) (81 and 89) between nodes corresponding to operational relationships between operations of the neural network (e.g., indicating data transfers between nodes). As is illustrated, as an example, in regards to node 74, each node may identify its input count (number of inputs), input type(s) (e.g., dense feature, sparse feature, user-related feature, etc.), operation(s) it provides (e.g., embedding, dot product, mathematical operator, non-linear function, etc.), or needed operational resources (e.g., computation intensity level, memory usage level, etc.). The operation nodal model 70 may be segmented (e.g., split or divided) into multiple graph-segments.

Figure 15:
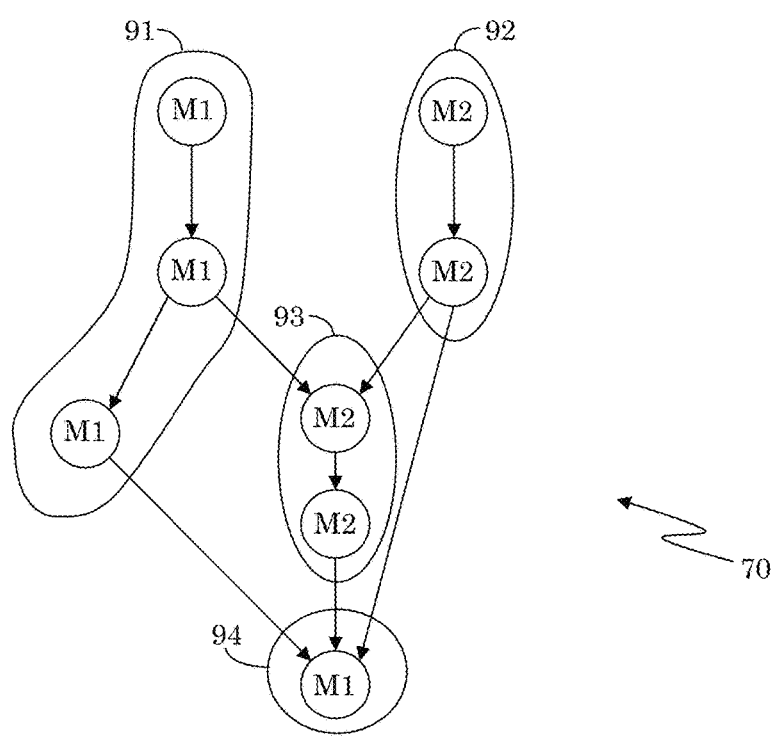
FIG. 15 illustrates an example of the operation nodal model of FIG. 14 divided into multiple graph-segments.

FIG. 15 illustrates an example of the operation nodal model 70 of FIG. 14 divided into multiple graph-segments (91 to 94). Optionally, the graph-segments may be configured to be sufficiently self-contained so that each may be processed (executed) independent of each other, as much as practical. Individual graph-segments may be distributed (designated) for execution to specific machines (e.g., the local machine or remote machine as described above) that have the appropriate resources (e.g., high computational resources or high data storage resources) for executing the individual graph-segments. For example, compute intensive graph-segments may be designated for processing within the local machine (as indicated by an "LM" node designation in FIG. 15), and memory intensive graph-segments may be designate for processing on the remote machine (as indicated by an "RM" node designation). Optionally, the machine designation may also take into account network traffic congestion. For example, if a particular dense feature input requires embedding, and the embedding tables are stored on the remote machine, then it may be advisable to designate the node that applies embedding to the dense input for execution on the remote machine. But since dense feature inputs may be large, the transfer of the large dense feature input from the local machine to the remote machine may slow down the computer network. In this case, the node that applies embedding to the dense input may be designated for execution on the local machine, and the local machine may be configured to hold trained matrices needed for generating low-dimensional representations of dense features, such as by embedding or by linear transformation. Irrespective, the output results of executing graph segments on the remote machine or local machine may be sent to a merge processing block where they may be merged into a reconstruction of the graph representation of the original ML model 70, and a final result is determined. Optionally, the merge processing block may reside within the local machine.

Machine designation of a node may be determined using any of several methods/systems/mechanisms. For example, an operational cost value of each node may be estimated, such as by means of a cost function, and the operational cost value may be used to determine whether a graph node receives a machine designation indicting preferred execution within local machine (having a higher computational capacity) or preferred execution within the remote machine (having a higher memory storage capacity). For example, a cost function may evaluate each node, or group of nodes, based on estimated computational requirements and memory usage (and optionally the node's number of inputs), and thereby determine its machine designation. The number of inputs may be relevant since, in particular embodiments, the local machine receives all inputs, and the inputs to a node may need to be transferred over the network from the local machine to the remote machine. Since it is desirable to minimize network traffic, if the number of inputs to a node is higher than a predefined value, then the cost value of that node may be weighed toward execution on the local machine in order to avoid transfer of all the inputs across the network.

The cost value may also be based on the input type (e.g. dense feature or sparse feature) of the graph node or operational resources needed by the graph node. In particular embodiments, nodes that have a sparse feature input type may be designated for preferred execution on the remote machine (e.g. the machine having higher memory resources), and nodes that have a dense feature input type may be designated for preferred execution on the local machine (e.g. the machine having a higher computational capacity). The operational cost value may also be based on a node's operation (e.g., multiplication, addition, embedding, dot product, etc.), parameters, or output. For example, a cost function may be used to quantify the cost of operation based on, e.g., the amount of read/write data access required, the type of operation performed (e.g., a database query is computationally cheaper than a database join junction), the number of inputs and parameters that need to be processed, etc. The cost characteristics of each node may be used to determine whether it is suitable for local or remote processing. The operation nodal model 70 may then be segmented into multiple graph-segments (e.g., 91-94) based on the operational cost value for each graph node. That is, graph nodes that are linked together and have a similar machine designation may be grouped into a graph segments that are assigned for execution on a particular machine. Optionally, the graph segments may be selected so as to ensure that no nodes designated for local execution are dependent upon remote intermediate data/results, and no nodes designated for remote execution are dependent upon local intermediate data/results. Nonetheless, the results of the processed graph segments (e.g., intermediate data results) are sent to the merge processing block (within the local machine), where they are joined in accordance with the operation nodal model 70. Optionally, processing of any graph segment that needs an intermediate result may be finished within the merge processing block.

A cost function, and thus machine designation of a node, may also be based on a nodes operation. Nodes whose operations predict/select candidate items (such as ads) may be identified. Typically, these candidate items are not directly related to user features. For example, a particular webpage that a user visited may have a list of candidate items (e.g. ads) associated with it. This association of candidate items is related to the individual webpage and not dependent upon the individual user. However, the node(s) is expected to evaluate the list of candidate items and make inferences about the user that visited the webpage to rank (identify) which ads may be most relevant to the user. These nodes need to identify relationships between pairs of inputs, and may be associated with embedding tables/matrices. Use of embedding tables may require higher amounts of memory. Therefore, optionally, nodes associated with embedding tables may be designated for evaluation on the remote machine. That is, (select) embedding tables may be kept on the remote machine (e.g., remote predictor), and nodes whose operations require access to these embedding tables may be designated for remote execution. Conversely, nodes whose operations depend only on input features and parameters that do not require embedding tables may be designated for execution on the local machine. Additionally, graph nodes that define operations (such as dot products) on only embedding results from the remote predictor may be designated for execution on the remote machine to limit transmission of embedding vectors across the network.

Execution of the operation nodal model 70 may further include identifying individual nodes, or subsets of nodes, whose operations depend only on user features (features/characteristics dependent on (or descriptive of) an individual user/person) such as webpages the user visited, "liked", "shared", commented upon, etc. These nodes may be designated to be executed only once, and their results may be sent over the network, if needed, only once. In the present example, these nodes may be evaluated on the local machine, and the results sent over the network to the remote machine only once. The remote machine may maintain a copy and send copies locally to any graph nodes within the remote machine that need such information. For example, if it is desirable to execute multiple instances of the operation nodal model 70 (corresponding to an NN ML model that evaluates a user/request-and-candidate item pairs, as explained above) that have the same user features as input (correspond to the same user/request), the local machine (which may receive all inputs) may send the different candidate items (sparse feature inputs) across the network to the remote machine, but send the user/request (user features) across the network to the remote machine only once. The remote machine may use the same copy of the user features (or processed user features received from the local machine) to evaluate the graph segments of the multiple instances of the operation nodal model 70 that are assigned for execution on the remote machine.

Figure 16:
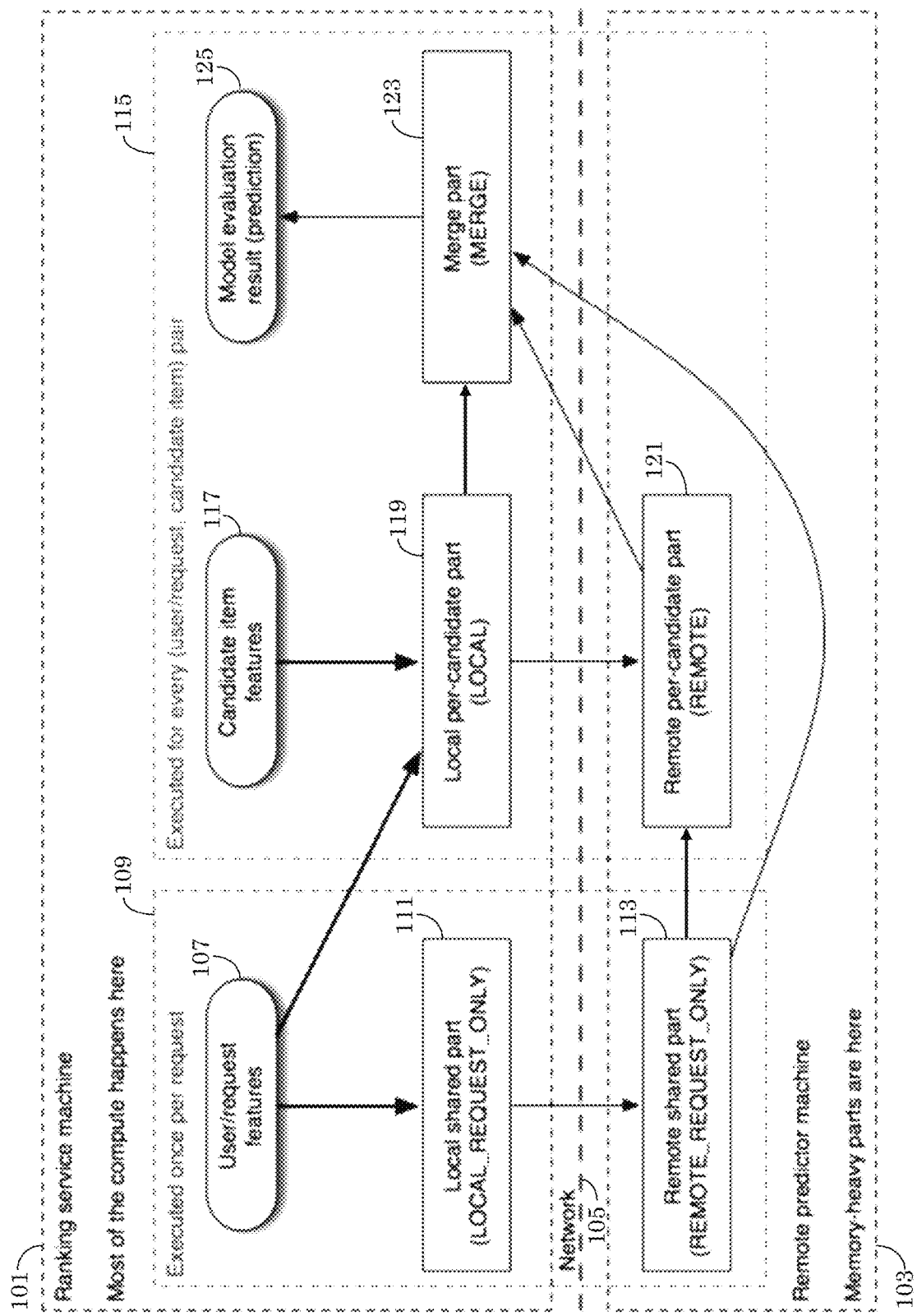
FIG. 16 illustrates an example, optimized data path flow between a local machine and a remote machine.

FIG. 16 illustrates an example, optimized data path flow between a local machine 101 and a remote machine 103. As is explained above, the ML model may be represented as a graph of operations and parameters, which may be executed within an NN learning framework, such as Facebook's Caffe2 NN framework. Each node (as illustrated in FIGS. 14 and 15) may be characterized by its compute requirements (e.g. floating point operations per second, FLOPS, of the operator) and memory requirements (e.g., size of the parameters). In a serving setting, a ranking service for a given request from a single user may need to evaluate a model on several (usually hundreds) candidate items (e.g. ads). A single ranking service machine may need to be able to predict several different models at the same time, and all of those models might not feed into a single machine memory. On the other hand, because of structure of SparseNN and the large number of dense features used, model evaluation may not be completely offloaded to the remote machine. Additionally, sending all of them over a wire (network) may not be optimal. Also in some cases, it is beneficial to concentrate compute-intensive work inside the ranking service which is optimized for it.

Another consideration is that some parts of the model may depend only on user/request features and thus would be the same for each of the candidate items ranked (e.g. embedding matrix that depends on user features). A practical implementation (setup) may involve splitting the (SparseNN-like) ML model into several parts (e.g. graph segments) to optimize computational efficiency. For example, the part of the model that depends exclusively on user/request features may get executed once for the entire batch of candidates. The model may also be split between a local (ranking) machine and a remote (predictor) machine such that the amount of intermediate results sent over the network is minimized while a limit on memory is imposed on the local part and a limit on compute intensity is imposed on the remote part. Machine designation of a node, may at least in part, be based on these imposed designations.

Based on above considerations the model may be divided into multiple parts ("nets" in Caffe2 terms), and an execution engine that handles passing of intermediate results between them may be implemented.

In the example of FIG. 16, the local machine 101, which may be a ranking server, may execute most of the compute-intensive operations, and the remote machine 103, which may be a remote predictor machine, may execute most of the memory-heavy operations. The local machine 101 and remote machine 103 may communicate with each other across a computer network 105. In operation, the local machine 101 may face remote users and receive all user inputs, including user/request features 107. As is explained above, all or part of user/request features 107 may be executed on local machine 101 or on remote machine 103. Optionally, operations 109 on user/request features 107 that may not involve other inputs (e.g. preprocessing operations) may be executed only once on the local machine 101 (e.g. local shared parts 111) or on the remote machine 103 (e.g. remote shared part 113) or both. If the remote machine 103 needs user/request features for processing (e.g., to process a graph segment that may need a user/request feature), then the (needed) user/request features may be transferred (from local machine 101 to remote machine 103) across network 105 only once.

The local machine accesses the sparse input (e.g., candidate item features 117), and processing block 115 may execute user/request-and-candidate item pairs, as discussed above. For example, local per-candidate part block 119 may execute graph segments (or operational nodes) that process user/request-and-candidate item pairs within local machine 101, and remote per-candidate part block 121 may execute graph segments (or operational nodes) that process user/request-and-candidate item pairs within remote machine 103. The local per-candidate part block 119 may receive user/request features (e.g., dense inputs) directly from user/request features 107 since they are both on the same local machine 101. Sparse inputs (e.g., candidate item features) may be transferred from local per-candidate part block 119 across network 105 to remote per-candidate part block 121. Remote shared part 133 may provide remote per-candidate part block 121 with user/request features (e.g., dense feature inputs). The processed results from local per-candidate part block 119, remote per-candidate part block 121, and remote shared part 113 may be transferred to a merge part (e.g. merge processing block) 123 to be combined and obtained a final model result evaluated, as is explained above. Block 125 may then collect (or transmit to a remote user) the model evaluation result (e.g., prediction).

Figure 17:
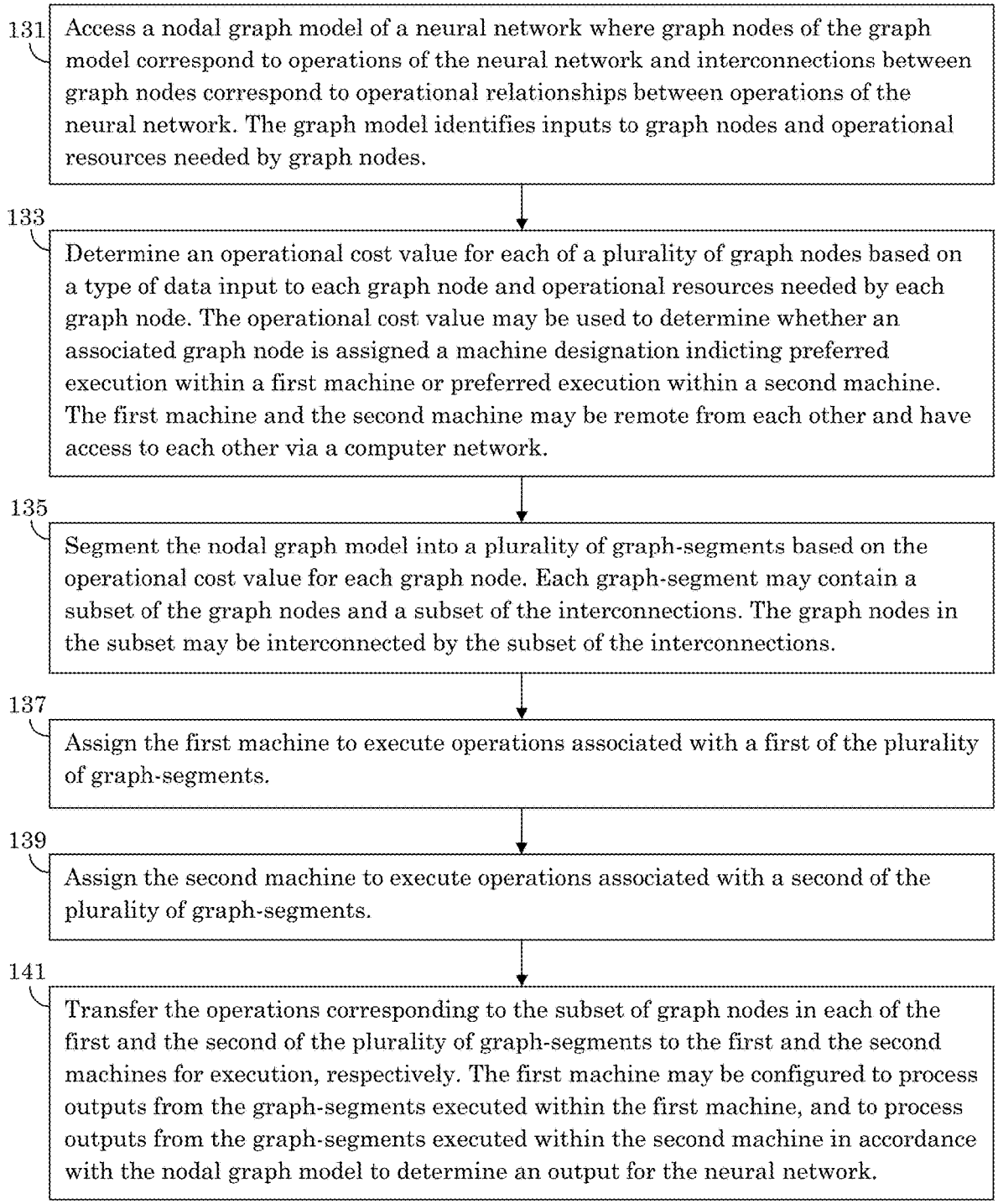
FIG. 17 illustrates an example method for the operational stage of a trained ML model divided between two machines.

FIG. 17 illustrates an example method for the operational stage of a trained ML model divided between two machines. The method may begin at step 131, where a nodal graph model (e.g., 70) of a neural network is accessed, where graph nodes (e.g., 71-78) of the graph model correspond to operations of the neural network and interconnections (e.g. 81-89) between graph nodes correspond to operational relationships between operations of the neural network. The graph model identifies inputs to graph nodes and operational resources needed by graph nodes (e.g., see node 74 of FIG. 14). Step 133 determine an operational cost value for each of a plurality of graph nodes based on a type of data input to each graph node and operational resources needed by each graph node. The operational cost value may be used to determine whether an associated graph node is assigned a machine designation (e.g., M1 or M2 in FIG. 15) indicting preferred execution within a first machine or preferred execution within a second machine. The first machine (e.g., 101) and the second machine (e.g., 103) may be remote from each other and have access to each other via a computer network (e.g., 105). In step 135, the nodal graph model is segmented into a plurality of graph-segments (e.g., 91-94 in FIG. 15) based on the operational cost value for each graph node. Each graph-segment may contain a subset of the graph nodes and a subset of the interconnections. The graph nodes in the subset may be interconnected by the subset of the interconnections. In step 137, the first machine (e.g., 101) is assigned to execute operations associated with a first of the plurality of graph-segments (e.g., 91). In step 139, the second machine (e.g., 103) is assigned to execute operations associated with a second of the plurality of graph-segments (e.g., 92). Step 141 transfer the operations corresponding to the subset of graph nodes in the first of the plurality of graph-segments to the first machine for execution, and transfers the operations corresponding to the subset of graph nodes in the second of the plurality of graph-segments to the second machine for execution. The first machine (e.g., 101) may be configured to process outputs (e.g., by Merge 123) from the graph-segments executed within the first machine (e.g., 101), and to process outputs from the graph-segments executed within the second machine (e.g., 103) in accordance with the nodal graph model (e.g., 70) to determine an output (e.g., 125) for the neural network.

Particular embodiments may repeat one or more steps of the method of FIG. 17, where appropriate. Although this disclosure describes and illustrates particular steps of the method of FIG. 17 as occurring in a particular order, this disclosure contemplates any suitable steps of the method of FIG. 17 occurring in any suitable order. Moreover, although this disclosure describes and illustrates an example method for the operational stage of a trained ML model divided between two machines including the particular steps of the method of FIG. 17, this disclosure contemplates any suitable method for the operational stage of a trained ML model divided between two machines including any suitable steps, which may include all, some, or none of the steps of the method of FIG. 17, where appropriate. Furthermore, although this disclosure describes and illustrates particular components, devices, or systems carrying out particular steps of the method of FIG. 17, this disclosure contemplates any suitable combination of any suitable components, devices, or systems carrying out any suitable steps of the method of FIG. 17.

Figure 18:
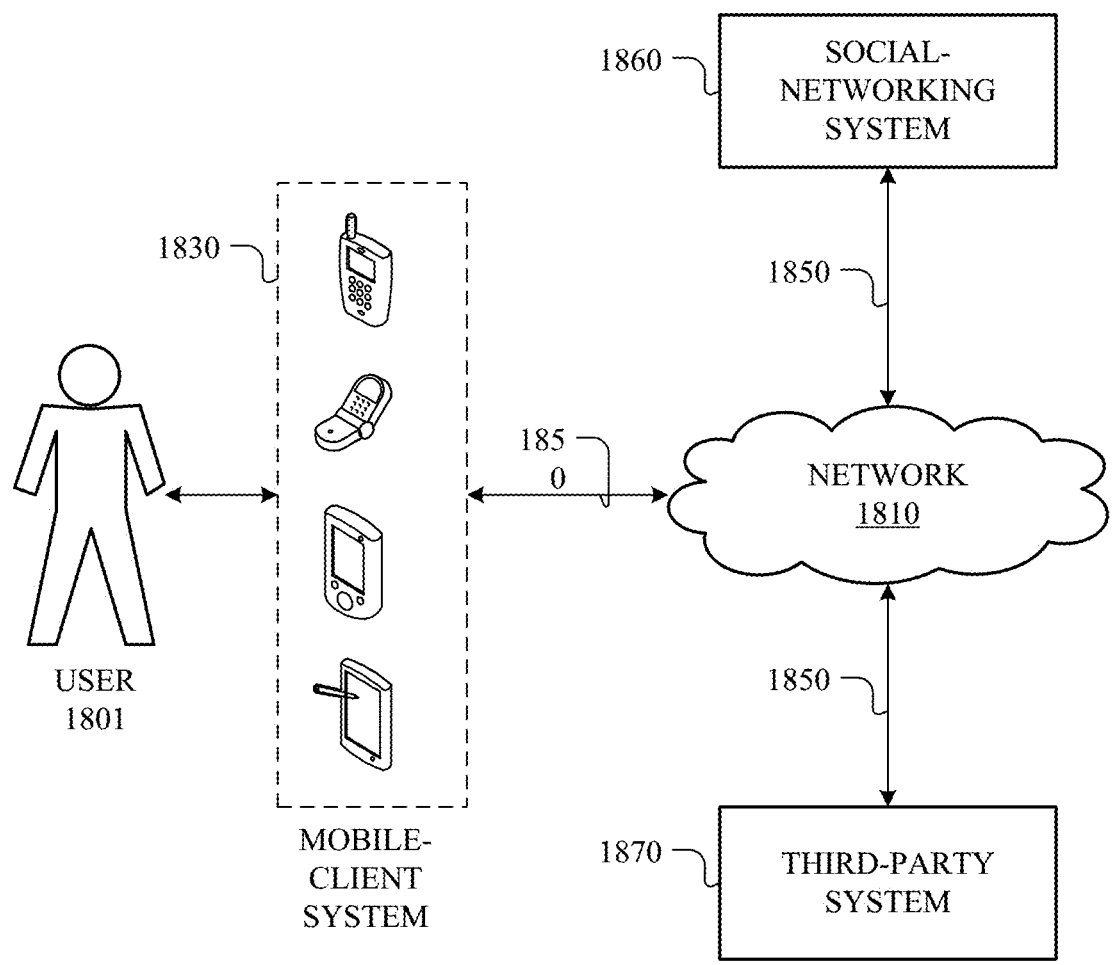
FIG. 18 illustrates an example network environment associated with a social-networking system.

Above, local machine 101 may face remote users and receive inputs from, and provide services (e.g. candidate items/predictions) to the users. These users may be part of a social graph, as explained below, and be accessed via a network environment. FIG. 18 illustrates an example network environment 1800 associated with a social-networking system. Network environment 1800 includes a user 1801, a client system 1830, a social-networking system 1860, and a third-party system 1870 connected to each other by a network 1810. Although FIG. 18 illustrates a particular arrangement of user 1801, client system 1830, social-networking system 1860, third-party system 1870, and network 1810, this disclosure contemplates any suitable arrangement of user 1801, client system 1830, social-networking system 1860, third-party system 1870, and network 1810. As an example and not by way of limitation, two or more of client system 1830, social-networking system 1860, and third-party system 1870 may be connected to each other directly, bypassing network 1810. As another example, two or more of client system 1830, social-networking system 1860, and third-party system 1870 may be physically or logically co-located with each other in whole or in part. Moreover, although FIG. 18 illustrates a particular number of users 1801, client systems 1830, social-networking systems 1860, third-party systems 1870, and networks 1810, this disclosure contemplates any suitable number of users 1801, client systems 1830, social-networking systems 1860, third-party systems 1870, and networks 1810. As an example and not by way of limitation, network environment 1800 may include multiple users 1801, client system 1830, social-networking systems 1860, third-party systems 1870, and networks 1810.

In particular embodiments, user 1801 may be an individual (human user), an entity (e.g., an enterprise, business, or third-party application), or a group (e.g., of individuals or entities) that interacts or communicates with or over social-networking system 1860. In particular embodiments, social-networking system 1860 may be a network-addressable computing system hosting an online social network. Social-networking system 1860 may generate, store, receive, and send social-networking data, such as, for example, user-profile data, concept-profile data, social-graph information, or other suitable data related to the online social network. Social-networking system 1860 may be accessed by the other components of network environment 1800 either directly or via network 1810. In particular embodiments, social-networking system 1860 may include an authorization server (or other suitable component(s)) that allows users 1801 to opt in to or opt out of having their actions logged by social-networking system 1860 or shared with other systems (e.g., third-party systems 1870), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 1870 may be a network-addressable computing system that can host a third party webpage. Third-party system 1870 may generate, store, receive, and send content, such as, for example, ads identified by social-networking system 1860. Third-party system 1870 may be accessed by the other components of network environment 1800 either directly or via network 1810. In particular embodiments, one or more users 1801 may use one or more client systems 1830 to access, send data to, and receive data from social-networking system 1860 or third-party system 1870. Client system 1830 may access social-networking system 1860 or third-party system 1870 directly, via network 1810, or via a third-party system. As an example and not by way of limitation, client system 1830 may access third-party system 1870 via social-networking system 1860. Client system 1830 may be any suitable computing device, such as, for example, a personal computer, a laptop computer, a cellular telephone, a smartphone, a tablet computer, or an augmented/virtual reality device.

This disclosure contemplates any suitable network 1810. As an example and not by way of limitation, one or more portions of network 1810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1810 may include one or more networks 1810.

Links 1850 may connect client system 1830, social-networking system 1860, and third-party system 1870 to communication network 1810 or to each other. This disclosure contemplates any suitable links 1850. In particular embodiments, one or more links 1850 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1850, or a combination of two or more such links 1850. Links 1850 need not necessarily be the same throughout network environment 1800. One or more first links 1850 may differ in one or more respects from one or more second links 1850.

Figure 19:
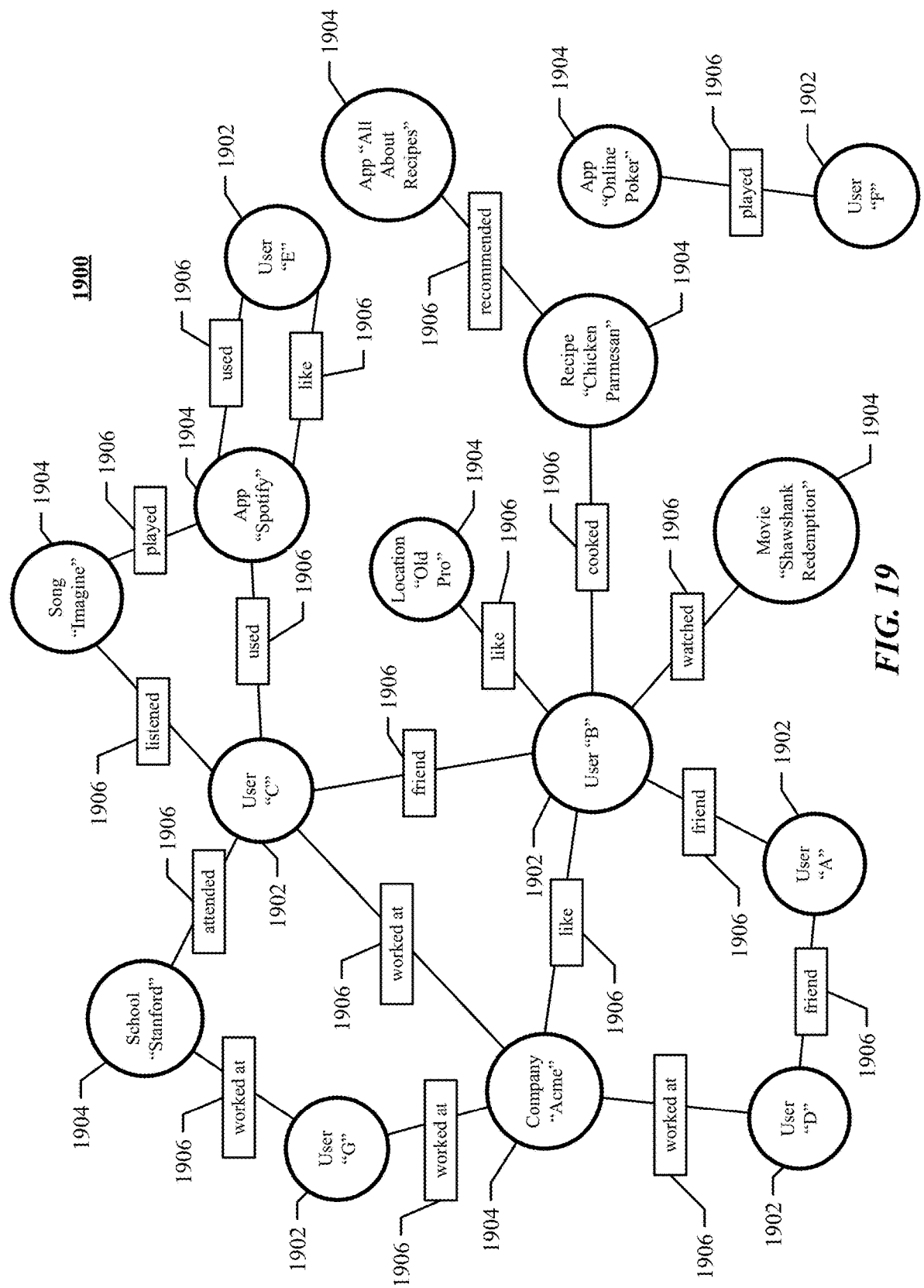
FIG. 19 illustrates an example social graph.

FIG. 19 illustrates example social graph 1900. In particular embodiments, social-networking system 1860 may store one or more social graphs 1900 in one or more data stores. In particular embodiments, social graph 1900 may include multiple nodes—which may include multiple user nodes 1902 or multiple concept nodes 1904—multiple edges 1906 connecting the nodes. Example social graph 1900 illustrated in FIG. 19 is shown, for didactic purposes, in a two-dimensional visual map representation. In particular embodiments, a social-networking system 1860, client system 1830, or third-party system 1870 may access social graph 1900 and related social-graph information for suitable applications. The nodes and edges of social graph 1900 may be stored as data objects, for example, in a data store (such as a social-graph database). Such a data store may include one or more searchable or queryable indexes of nodes or edges of social graph 1900.

In particular embodiments, a user node 1902 may correspond to a user of social-networking system 1860. As an example and not by way of limitation, a user may be an individual (human user), an entity (e.g., an enterprise, business, or third-party application), or a group (e.g., of individuals or entities) that interacts or communicates with or over social-networking system 1860. In particular embodiments, when a user registers for an account with social-networking system 1860, social-networking system 1860 may create a user node 1902 corresponding to the user, and store the user node 1902 in one or more data stores. Users and user nodes 1902 described herein may, where appropriate, refer to registered users and user nodes 1902 associated with registered users. In addition or as an alternative, users and user nodes 1902 described herein may, where appropriate, refer to users that have not registered with social-networking system 1860. In particular embodiments, a user node 1902 may be associated with information provided by a user or information gathered by various systems, including social-networking system 1860. As an example and not by way of limitation, a user may provide his or her name, profile picture, contact information, birth date, sex, marital status, family status, employment, education background, preferences, interests, or other demographic information. In particular embodiments, a user node 1902 may be associated with one or more data objects corresponding to information associated with a user. In particular embodiments, a user node 1902 may correspond to one or more webpages.

In particular embodiments, a concept node 1904 may correspond to a concept. As an example and not by way of limitation, a concept may correspond to a place (such as, for example, a movie theater, restaurant, landmark, or city); a website (such as, for example, a website associated with social-network system 1860 or a third-party website associated with a web-application server); an entity (such as, for example, a person, business, group, sports team, or celebrity); a resource (such as, for example, an audio file, video file, digital photo, text file, structured document, or application) which may be located within social-networking system 1860 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 1904 may be associated with information of a concept provided by a user or information gathered by various systems, including social-networking system 1860. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1904 may be associated with one or more data objects corresponding to information associated with concept node 1904. In particular embodiments, a concept node 1904 may correspond to one or more webpages.

In particular embodiments, a node in social graph 1900 may represent or be represented by a webpage (which may be referred to as a "profile page"). Profile pages may be hosted by or accessible to social-networking system 1860. Profile pages may also be hosted on third-party websites associated with a third-party system 1870. As an example and not by way of limitation, a profile page corresponding to a particular external webpage may be the particular external webpage and the profile page may correspond to a particular concept node 1904. Profile pages may be viewable by all or a selected subset of other users. As an example and not by way of limitation, a user node 1902 may have a corresponding user-profile page in which the corresponding user may add content, make declarations, or otherwise express himself or herself. As another example and not by way of limitation, a concept node 1904 may have a corresponding concept-profile page in which one or more users may add content, make declarations, or express themselves, particularly in relation to the concept corresponding to concept node 1904.

In particular embodiments, a concept node 1904 may represent a third-party webpage or resource hosted by a third-party system 1870. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 1830 to send to social-networking system 1860 a message indicating the user's action. In response to the message, social-networking system 1860 may create an edge (e.g., a check-in-type edge) between a user node 1902 corresponding to the user and a concept node 1904 corresponding to the third-party webpage or resource and store edge 1906 in one or more data stores.

In particular embodiments, a pair of nodes in social graph 1900 may be connected to each other by one or more edges 1906. An edge 1906 connecting a pair of nodes may represent a relationship between the pair of nodes. In particular embodiments, an edge 1906 may include or represent one or more data objects or attributes corresponding to the relationship between a pair of nodes. As an example and not by way of limitation, a first user may indicate that a second user is a "friend" of the first user. In response to this indication, social-networking system 1860 may send a "friend request" to the second user. If the second user confirms the "friend request," social-networking system 1860 may create an edge 1906 connecting the first user's user node 1902 to the second user's user node 1902 in social graph 1900 and store edge 1906 as social-graph information in one or more of data stores 1864. In the example of FIG. 19, social graph 1900 includes an edge 1906 indicating a friend relation between user nodes 1902 of user "A" and user "B" and an edge indicating a friend relation between user nodes 1902 of user "C" and user "B." Although this disclosure describes or illustrates particular edges 1906 with particular attributes connecting particular user nodes 1902, this disclosure contemplates any suitable edges 1906 with any suitable attributes connecting user nodes 1902. As an example and not by way of limitation, an edge 1906 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1900 by one or more edges 1906.

In particular embodiments, an edge 1906 between a user node 1902 and a concept node 1904 may represent a particular action or activity performed by a user associated with user node 1902 toward a concept associated with a concept node 1904. As an example and not by way of limitation, as illustrated in FIG. 19, a user may "like," "attended," "played," "listened," "cooked," "worked at," or "watched" a concept, each of which may correspond to an edge type or subtype. A concept-profile page corresponding to a concept node 1904 may include, for example, a selectable "check in" icon (such as, for example, a clickable "check in" icon) or a selectable "add to favorites" icon. Similarly, after a user clicks these icons, social-networking system 1860 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 1860 may create a "listened" edge 1906 and a "used" edge (as illustrated in FIG. 19) between user nodes 1902 corresponding to the user and concept nodes 1904 corresponding to the song and application to indicate that the user listened to the song and used the application. Moreover, social-networking system 1860 may create a "played" edge 1906 (as illustrated in FIG. 19) between concept nodes 1904 corresponding to the song and the application to indicate that the particular song was played by the particular application. In this case, "played" edge 1906 corresponds to an action performed by an external application (SPOTIFY) on an external audio file (the song "Imagine"). Although this disclosure describes particular edges 1906 with particular attributes connecting user nodes 1902 and concept nodes 1904, this disclosure contemplates any suitable edges 1906 with any suitable attributes connecting user nodes 1902 and concept nodes 1904. Moreover, although this disclosure describes edges between a user node 1902 and a concept node 1904 representing a single relationship, this disclosure contemplates edges between a user node 1902 and a concept node 1904 representing one or more relationships. As an example and not by way of limitation, an edge 1906 may represent both that a user likes and has used at a particular concept. Alternatively, another edge 1906 may represent each type of relationship (or multiples of a single relationship) between a user node 1902 and a concept node 1904 (as illustrated in FIG. 19 between user node 1902 for user "E" and concept node 1904 for "SPOTIFY").

In particular embodiments, social-networking system 1860 may create an edge 1906 between a user node 1902 and a concept node 1904 in social graph 1900. As an example and not by way of limitation, a user viewing a concept-profile page (such as, for example, by using a web browser or a special-purpose application hosted by the user's client system 1830) may indicate that he or she likes the concept represented by the concept node 1904 by clicking or selecting a "Like" icon, which may cause the user's client system 1830 to send to social-networking system 1860 a message indicating the user's liking of the concept associated with the concept-profile page. In response to the message, social-networking system 1860 may create an edge 1906 between user node 1902 associated with the user and concept node 1904, as illustrated by "like" edge 1906 between the user and concept node 1904. In particular embodiments, social-networking system 1860 may store an edge 1906 in one or more data stores. In particular embodiments, an edge 1906 may be automatically formed by social-networking system 1860 in response to a particular user action. As an example and not by way of limitation, if a first user uploads a picture, watches a movie, or listens to a song, an edge 1906 may be formed between user node 1902 corresponding to the first user and concept nodes 1904 corresponding to those concepts. Although this disclosure describes forming particular edges 1906 in particular manners, this disclosure contemplates forming any suitable edges 1906 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 1860). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 1860 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 1860) or RSVP (e.g., through social-networking system 1860) to an event associated with the advertisement. In addition or as an alternative, an advertisement may include social-networking-system content directed to the user. As an example and not by way of limitation, an advertisement may display information about a friend of the user within social-networking system 1860 who has taken an action associated with the subject matter of the advertisement.

Figure 20:
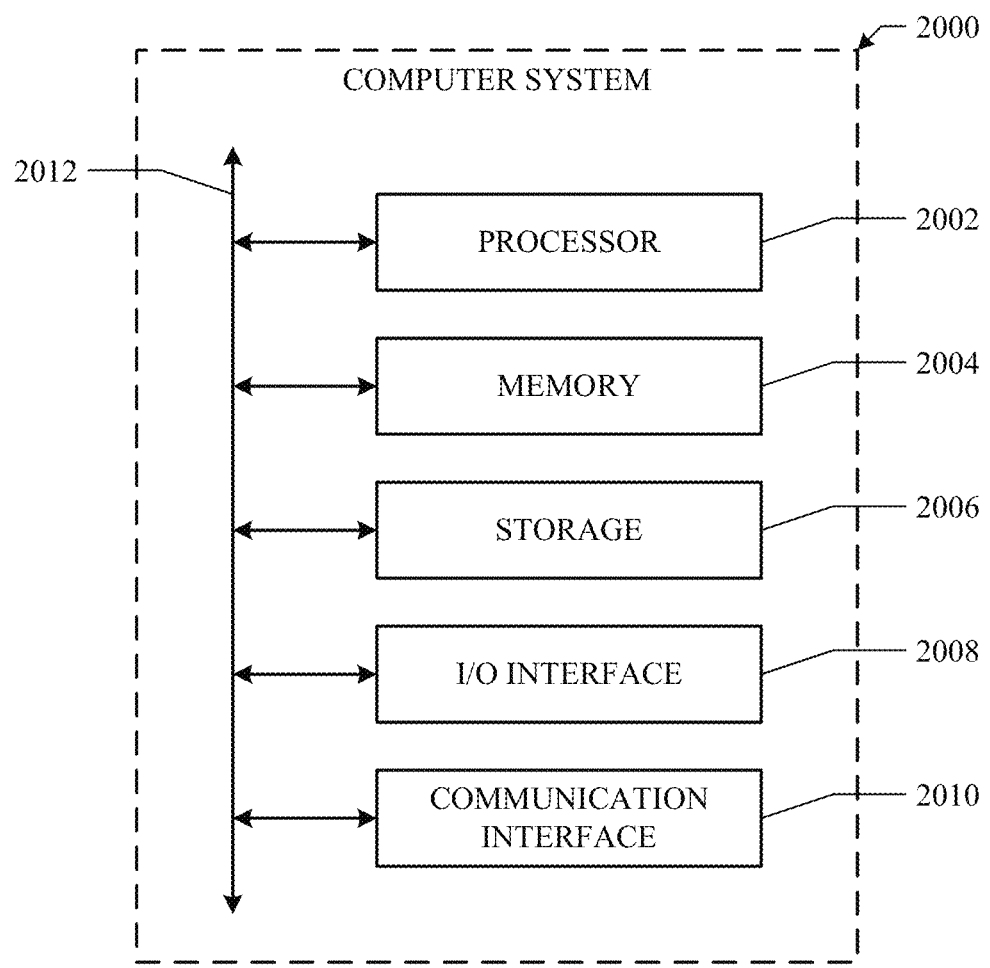
FIG. 20 illustrates an example computer system.

FIG. 20 illustrates an example computer system 2000. In particular embodiments, one or more computer systems 2000 perform one or more steps of one or more methods described or illustrated herein. In particular embodiments, one or more computer systems 2000 provide functionality described or illustrated herein. In particular embodiments, software running on one or more computer systems 2000 performs one or more steps of one or more methods described or illustrated herein or provides functionality described or illustrated herein. Particular embodiments include one or more portions of one or more computer systems 2000. Herein, reference to a computer system may encompass a computing device, and vice versa, where appropriate. Moreover, reference to a computer system may encompass one or more computer systems, where appropriate.

This disclosure contemplates any suitable number of computer systems 2000. This disclosure contemplates computer system 2000 taking any suitable physical form. As example and not by way of limitation, computer system 2000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 2000 may include one or more computer systems 2000; be unitary or distributed; span multiple locations; span multiple machines; span multiple data centers; or reside in a cloud, which may include one or more cloud components in one or more networks. Where appropriate, one or more computer systems 2000 may perform without substantial spatial or temporal limitation one or more steps of one or more methods described or illustrated herein. As an example and not by way of limitation, one or more computer systems 2000 may perform in real time or in batch mode one or more steps of one or more methods described or illustrated herein. One or more computer systems 2000 may perform at different times or at different locations one or more steps of one or more methods described or illustrated herein, where appropriate.

In particular embodiments, computer system 2000 includes a processor 2002, memory 2004, storage 2006, an input/output (I/O) interface 2008, a communication interface 2010, and a bus 2012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2002 includes hardware for executing instructions, such as those making up a computer program. As an example and not by way of limitation, to execute instructions, processor 2002 may retrieve (or fetch) the instructions from an internal register, an internal cache, memory 2004, or storage 2006; decode and execute them; and then write one or more results to an internal register, an internal cache, memory 2004, or storage 2006. In particular embodiments, processor 2002 may include one or more internal caches for data, instructions, or addresses. This disclosure contemplates processor 2002 including any suitable number of any suitable internal caches, where appropriate. As an example and not by way of limitation, processor 2002 may include one or more instruction caches, one or more data caches, and one or more translation lookaside buffers (TLBs). Instructions in the instruction caches may be copies of instructions in memory 2004 or storage 2006, and the instruction caches may speed up retrieval of those instructions by processor 2002. Data in the data caches may be copies of data in memory 2004 or storage 2006 for instructions executing at processor 2002 to operate on; the results of previous instructions executed at processor 2002 for access by subsequent instructions executing at processor 2002 or for writing to memory 2004 or storage 2006; or other suitable data. The data caches may speed up read or write operations by processor 2002. The TLBs may speed up virtual-address translation for processor 2002. In particular embodiments, processor 2002 may include one or more internal registers for data, instructions, or addresses. This disclosure contemplates processor 2002 including any suitable number of any suitable internal registers, where appropriate. Where appropriate, processor 2002 may include one or more arithmetic logic units (ALUs); be a multi-core processor; or include one or more processors 2002. Although this disclosure describes and illustrates a particular processor, this disclosure contemplates any suitable processor.

In particular embodiments, memory 2004 includes main memory for storing instructions for processor 2002 to execute or data for processor 2002 to operate on. As an example and not by way of limitation, computer system 2000 may load instructions from storage 2006 or another source (such as, for example, another computer system 2000) to memory 2004. Processor 2002 may then load the instructions from memory 2004 to an internal register or internal cache. To execute the instructions, processor 2002 may retrieve the instructions from the internal register or internal cache and decode them. During or after execution of the instructions, processor 2002 may write one or more results (which may be intermediate or final results) to the internal register or internal cache. Processor 2002 may then write one or more of those results to memory 2004. In particular embodiments, processor 2002 executes only instructions in one or more internal registers or internal caches or in memory 2004 (as opposed to storage 2006 or elsewhere) and operates only on data in one or more internal registers or internal caches or in memory 2004 (as opposed to storage 2006 or elsewhere). One or more memory buses (which may each include an address bus and a data bus) may couple processor 2002 to memory 2004. Bus 2012 may include one or more memory buses, as described below. In particular embodiments, one or more memory management units (MMUs) reside between processor 2002 and memory 2004 and facilitate accesses to memory 2004 requested by processor 2002. In particular embodiments, memory 2004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2004 may include one or more memories 2004, where appropriate. Although this disclosure describes and illustrates particular memory, this disclosure contemplates any suitable memory.

In particular embodiments, storage 2006 includes mass storage for data or instructions. As an example and not by way of limitation, storage 2006 may include a hard disk drive (HDD), a floppy disk drive, flash memory, an optical disc, a magneto-optical disc, magnetic tape, or a Universal Serial Bus (USB) drive or a combination of two or more of these. Storage 2006 may include removable or non-removable (or fixed) media, where appropriate. Storage 2006 may be internal or external to computer system 2000, where appropriate. In particular embodiments, storage 2006 is non-volatile, solid-state memory. In particular embodiments, storage 2006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2006 taking any suitable physical form. Storage 2006 may include one or more storage control units facilitating communication between processor 2002 and storage 2006, where appropriate. Where appropriate, storage 2006 may include one or more storages 2006. Although this disclosure describes and illustrates particular storage, this disclosure contemplates any suitable storage.

In particular embodiments, I/O interface 2008 includes hardware, software, or both, providing one or more interfaces for communication between computer system 2000 and one or more I/O devices. Computer system 2000 may include one or more of these I/O devices, where appropriate. One or more of these I/O devices may enable communication between a person and computer system 2000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2008 for them. Where appropriate, I/O interface 2008 may include one or more device or software drivers enabling processor 2002 to drive one or more of these I/O devices. I/O interface 2008 may include one or more I/O interfaces 2008, where appropriate. Although this disclosure describes and illustrates a particular I/O interface, this disclosure contemplates any suitable I/O interface.

In particular embodiments, communication interface 2010 includes hardware, software, or both providing one or more interfaces for communication (such as, for example, packet-based communication) between computer system 2000 and one or more other computer systems 2000 or one or more networks. As an example and not by way of limitation, communication interface 2010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2010 for it. As an example and not by way of limitation, computer system 2000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2000 may include any suitable communication interface 2010 for any of these networks, where appropriate. Communication interface 2010 may include one or more communication interfaces 2010, where appropriate. Although this disclosure describes and illustrates a particular communication interface, this disclosure contemplates any suitable communication interface.

In particular embodiments, bus 2012 includes hardware, software, or both coupling components of computer system 2000 to each other. As an example and not by way of limitation, bus 2012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2012 may include one or more buses 2012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
by a computing device, accessing a neural network having a module comprising embedding-pooling blocks, the module having a first input and a second input; and
by the computing device, using the module to:
process the first input to generate a plurality of first latent vector representations of the first input by submitting the first input to each of a first plurality of the embedding-pooling blocks, the plurality of first latent vector representations being different from each other and being respectively generated by the first plurality of the embedding-pooling blocks, wherein a number of the first plurality of the embedding-pooling blocks is determined based on a density of the first input;
process the second input to generate a plurality of second latent vector representations of the second input by submitting the second input to each of a second plurality of the embedding-pooling blocks, the plurality of second latent vector representations being different from each other and being respectively generated by the second plurality of the embedding-pooling blocks, wherein a number of the second plurality of the embedding-pooling blocks is determined based on a density of the second input;
determine unique pairwise combinations of latent vector representations, wherein each unique pairwise combination comprises latent vector representations selected from (1) the plurality of first latent vector representations of the first input and (2) the plurality of second latent vector representations of the second input;
model pairwise interactions between the unique pairwise combinations of latent vector representations; and
produce an intermediate output by combining results of the modeled pairwise interactions.

2. The method of claim 1, wherein the pairwise interactions are modeled by dot product operations or cosine similarity operations.

3. The method of claim 1, wherein results of the modeled pairwise interactions are combined by being concatenated together.

4. The method of claim 1, wherein the first and second latent vector representations are generated using linear transformation or embedding operations.

5. The method of claim 1, wherein the plurality of second latent vector representations of the second input are generated based on different embeddings associated with the second input.

6. The method of claim 5, wherein the different embeddings represent different related meanings of the second input.

7. The method of claim 1, wherein the first input and second input are both dense feature vectors or both sparse feature vectors.

8. The method of claim 1, wherein the first input is a dense feature vector, the second input is a sparse feature vector, and the dense feature vector is associated with a greater number of latent vector representations than the sparse feature vector.

9. The method of claim 1, wherein the neural network has a plurality of said modules, including a first module and a second module, and the intermediate output of the first module being fed forward to the first input of the second module.

10. The method of claim 9, wherein the second input of the second module is coupled to receive the same second input of the first module, the first module and second module generating a different, plurality of different second latent vector representations for their respective second input.

11. The method of claim 9, wherein the second input of the second module receives an input different than the second input of the first module.

12. The method of claim 1, wherein the module is a first module, the neural network further comprises a second module different than the first module, the second module having a third input, a fourth input, and a fifth input, the method further comprising:
by the computing device, the second module generating one third latent vector representation of the third input, one fourth latent vector representation of the fourth input, and one fifth latent vector representation of the fifth input;
by the computing device, the second module modeling second pairwise interactions between unique pairwise combination of the third latent vector representation, the fourth latent vector representation, and the fifth latent vector representation; and
by the computing device, the second module producing a second intermediate output by combining results of the second modeled pairwise interactions with the third input;
wherein the intermediate output of the first module is fed forward to one of the third, fourth or fifth input of the second module.

13. The method of claim 12, wherein:
the third input is a dense feature vector and the fourth and fifth inputs are both sparse feature vectors;
the neural network has a plurality of said second modules arranged in a feedforward arrangement; and
the second intermediate output of one second module feeds into the third input of the next second module in the feedforward arrangement.

14. The method of claim 1, wherein:
the plurality of first latent vector representations correspond to different related meanings of the first input;
the plurality of second latent vector representations correspond to different related meanings of the second input; and
the neural network is executable on a computer network having a network client, and execution of the neural network is used to provide a ranking of content determined to be of interest to the network client based on pairwise interactions of related meanings of the first input and second input.

15. One or more computer-readable non-transitory storage media embodying software that is operable when executed to:
   access a neural network having a module comprising embedding-pooling blocks, the module being a module of nodes and having a first input and a second input; and
   use the module to:
      process the first input to generate a plurality of first latent vector representations of the first input by submitting the first input to each of a first plurality of the embedding-pooling blocks, the plurality of first latent vector representations being different from each other and being respectively generated by the first plurality of the embedding-pooling blocks, wherein a number of the first plurality of the embedding-pooling blocks is determined based on a density of the first input;
      process the second input to generate a plurality of second latent vector representations of the second input by submitting the second input to each of a second plurality of the embedding-pooling blocks, the plurality of second latent vector representations being different from each other and being respectively generated by the second plurality of the embedding-pooling blocks, wherein a number of the second plurality of the embedding-pooling blocks is determined based on a density of the second input;
      determine unique pairwise combinations of latent vector representations, wherein each unique pairwise combination comprises latent vector representations selected from (1) the plurality of first latent vector representations of the first input and (2) the plurality of second latent vector representations of the second input;
      model pairwise interactions between the unique pairwise combinations of latent vector representations; and
      produce an intermediate output by combining results of the modeled pairwise interactions.

16. The media of claim 15, wherein the module is a first module, the neural network further comprises a second module different than the first module, the second module having a third input, a fourth input, and a fifth input, the software being further operable when executed to:
   generate one third latent vector representation of the third input, one fourth latent vector representation of the fourth input, and one fifth latent vector representation of the fifth input;
   model second pairwise interactions between unique pairwise combination of the third latent vector representation, the fourth latent vector representation, and the fifth latent vector representation; and
   produce a second intermediate output by combining results of the second modeled pairwise interactions with the third input;
   wherein the intermediate output of the first module is fed forward to one of the third, fourth or fifth input of the second module.

17. The media of claim 15, wherein:
   the second input is a sparse feature vector;
   the plurality of second latent vector representations of the second input are based on different embeddings associated with the second input, each embedding being trained to represent a different related meaning to the second input;
   the plurality of first latent vector representations correspond to different related meanings of the first input; and
   the neural network is executable on a computer network having a network client, and execution of the neural network is used to provide a ranking of content determined to be of interest to the network client based on pairwise interactions of related meanings of the first input and second input.

18. A system comprising:
   one or more processors; and
   one or more computer-readable non-transitory storage media coupled to one or more of the processors and comprising instructions operable when executed by one or more of the processors to cause the system to:
   access a neural network having a module comprising embedding-pooling blocks, the module being a module of nodes and having a first input and a second input; and
   use the module to:
      process the first input to generate a plurality of first latent vector representations of the first input by submitting the first input to each of a first plurality of the embedding-pooling blocks, the plurality of first latent vector representations being different from each other and being respectively generated by the first plurality of the embedding-pooling blocks, wherein a number of the first plurality of the embedding-pooling blocks is determined based on a density of the first input;
      process the second input to generate a plurality of second latent vector representations of the second input by submitting the second input to each of a second plurality of the embedding-pooling blocks, the plurality of second latent vector representations being different from each other and being respectively generated by the second plurality of the embedding-pooling blocks, wherein a number of the second plurality of the embedding-pooling blocks is determined based on a density of the second input;
      determine unique pairwise combinations of latent vector representations, wherein each unique pairwise combination comprises latent vector representations selected from (1) the plurality of first latent vector representations of the first input and (2) the plurality of second latent vector representations of the second input;
      model pairwise interactions between the unique pairwise combinations of latent vector representations; and
      produce an intermediate output by combining results of the modeled pairwise interactions.

19. The system of claim 18, wherein the module is a first module, the neural network further comprises a second module different than the first module, the second module having a third input, a fourth input, and a fifth input, the instructions being further operable when executed by one or more of the processors to cause the system to:
   generate one third latent vector representation of the third input, one fourth latent vector representation of the fourth input, and one fifth latent vector representation of the fifth input;
   model second pairwise interactions between unique pairwise combination of the third latent vector representation, the fourth latent vector representation, and the fifth latent vector representation; and produce a second intermediate output by combining results of the second modeled pairwise interactions with the third input;
wherein the intermediate output of the first module is fed forward to one of the third, fourth or fifth input of the second module.

20. The system of claim 18, wherein:

the second input is a sparse feature vector;

the plurality of second latent vector representations of the second input are based on different embeddings associated with the second input, each embedding being trained to represent a different related meaning to the second input;

the plurality of first latent vector representations correspond to different related meanings of the first input; and the neural network is executable on a computer network having a network client, and execution of the neural network is used to provide a ranking of content determined to be of interest to the network client based on pairwise interactions of related meanings of the first input and second input.

\* \* \* \* \*